US012250028B2

(12) United States Patent
Farrar et al.

(10) Patent No.: US 12,250,028 B2
(45) Date of Patent: *Mar. 11, 2025

(54) ENCODING STRATEGY SELECTION FOR DATA TRANSFER USING AUDIO TRANSMISSIONS

(71) Applicant: LISNR, Inc, Cincinnati, OH (US)

(72) Inventors: Rebekah Farrar, Columbus, OH (US); Oz Mendel, Piedmont, CA (US); William Knauer, Bellevue, KY (US)

(73) Assignee: LISNR, INC., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,679

(22) Filed: Dec. 21, 2022

(65) Prior Publication Data
US 2023/0123098 A1   Apr. 20, 2023

Related U.S. Application Data

(63) Continuation of application No. 17/400,783, filed on Aug. 12, 2021, now Pat. No. 11,539,449.
(Continued)

(51) Int. Cl.
*H04B 11/00* (2006.01)
*G10L 19/02* (2013.01)

(52) U.S. Cl.
CPC .............. *H04B 11/00* (2013.01); *G10L 19/02* (2013.01)

(58) Field of Classification Search
CPC .................. H04B 11/00; G10L 19/02
See application file for complete search history.

(56) References Cited

U.S. PATENT DOCUMENTS 11,095,999 B1    8/2021  Farrar et al.
11,146,836 B1 *  10/2021  Farrar ............... H04N 21/43615
(Continued)

FOREIGN PATENT DOCUMENTS

WO        2021101570         5/2021
WO    WO-2021101571 A1 *  5/2021  .............. G01S 11/14
(Continued)

OTHER PUBLICATIONS

International Search Report and Written Opinion for International Application No. PCT/US2021/045714, mailed Nov. 16, 2021.
(Continued)

*Primary Examiner* — Daniel Pihulic
(74) *Attorney, Agent, or Firm* — NORTON ROSE FULBRIGHT US LLP

(57) ABSTRACT

Methods and systems for improved transmission and receipt of audio transmissions containing data encoded according to different protocols are presented. In one embodiment, a method is provided that includes receiving a digital data bitstream containing data for transmission using an audio transmission. The digital data bitstream may be divided into a plurality of symbols (e.g., according to a type of encoding protocol to be used). An analog audio signal may be generated that encodes the plurality of symbols according to an encoding protocol (e.g., a PSK protocol and/or a DPSK protocol). The analog audio signal may be added to the audio transmission and the audio transmission may be transmitted using an audio transmitter.

20 Claims, 15 Drawing Sheets

Related U.S. Application Data

(60) Provisional application No. 63/065,221, filed on Aug. 13, 2020.

(56) References Cited

U.S. PATENT DOCUMENTS

| | | | |
|---|---|---|---|
| 11,539,449 B2 * | 12/2022 | Farrar | G10L 19/02 |
| 11,805,161 B2 | 10/2023 | Farrar et al. | |
| 2003/0035357 A1 * | 2/2003 | Ishii | G11B 20/10527 |
| | | | 369/59.24 |
| 2006/0268831 A1 * | 11/2006 | Ulybin | H04L 12/4633 |
| | | | 370/465 |
| 2008/0166126 A1 | 7/2008 | Ohm et al. | |
| 2009/0198499 A1 | 8/2009 | Lee et al. | |
| 2010/0021003 A1 | 1/2010 | Baum et al. | |
| 2016/0309278 A1 | 10/2016 | Hiscock | |
| 2018/0331724 A1 | 11/2018 | Li et al. | |
| 2019/0190621 A1 | 6/2019 | Prince et al. | |
| 2021/0218527 A1 | 7/2021 | Li et al. | |
| 2021/0226710 A1 | 7/2021 | Farrar et al. | |
| 2021/0360361 A1 | 11/2021 | Farrar et al. | |
| 2022/0030289 A1 * | 1/2022 | Farrar | H04N 21/43637 |
| 2022/0052768 A1 * | 2/2022 | Farrar | H04B 10/516 |
| 2022/0070601 A1 * | 3/2022 | Farrar | H04S 3/008 |
| 2022/0159053 A1 * | 5/2022 | Farrar | G10L 19/00 |
| 2022/0407547 A1 * | 12/2022 | Mendel | H04B 1/1027 |

FOREIGN PATENT DOCUMENTS

| | | |
|---|---|---|
| WO | WO 2021146586 | 7/2021 |
| WO | WO 2021188633 | 9/2021 |
| WO | WO 2021236731 | 11/2021 |
| WO | WO 2022036076 | 2/2022 |
| WO | WO-2022036076 A1 * | 2/2022 ............. G10L 19/00 |

OTHER PUBLICATIONS

International Search Report and Written Opinion issued in International Application No. PCT/US23/60128 mailed Jun. 7, 2023.

* cited by examiner

ENCODING STRATEGY SELECTION FOR DATA TRANSFER USING AUDIO TRANSMISSIONS

CROSS-REFERENCE TO RELATED APPLICATIONS

The present application claims priority to U.S. patent application Ser. No. 17/400,783, filed Aug. 12, 2021, which claims priority to U.S. Provisional Patent Application No. 63/065,221, filed on Aug. 13, 2020, each of which are incorporated by reference in their entirety.

BACKGROUND

Data often needs to be transmitted between computing devices without connecting both devices to the same computing network. For example, in certain applications, a computing network may not exist near the computing devices, or it may be too cumbersome (e.g., may take too long) to connect one or both of the computing devices to a nearby computing network. Therefore, data may be transmitted directly from one computing device to another computing device.

SUMMARY

The present disclosure presents new and innovative methods and systems for improved transmission and receipt of audio transmissions containing data encoded according to different encoding protocols. In a first aspect, a method is provided that includes receiving a digital data bitstream for a first audio transmission generated to transmit data and dividing the digital data bitstream into a plurality of symbols. The method may further include generating a first analog audio signal that encodes the plurality of symbols as phase differences according to a differential phase-shift keying (DPSK) protocol and transmitting, using an audio transmitter, a first audio transmission containing the first analog audio signal.

In a second aspect according to the first aspect, the DPSK protocol is a Quad-DPSK (QDPSK) protocol and each of the plurality of symbols is two bits in length.

In a third aspect according to any of the first and second aspects, the DPSK protocol is an 8DPSK protocol and each of the plurality of symbols is three bits in length.

In a fourth aspect according to any of the first through third aspects, the audio transmission further includes a predetermined portion.

In a fifth aspect according to the fourth aspect, the predetermined portion is encoded according to a phase-shift keying protocol.

In a sixth aspect according to any of the fourth and fifth aspects, the predetermined portion indicates that the first analog audio signal is encoded using the DPSK protocol.

In a seventh aspect according to any of the first through sixth aspects, the method further includes receiving a second audio transmission containing a second analog audio signal and decoding, according to the DPSK protocol, the second audio transmission to extract a second analog audio signal.

In an eighth aspect according to the seventh aspect, the method further includes determining that the second audio transmission was unsuccessfully decoded using the DPSK protocol and decoding, according to at least one of (i) a phase-shift keying (PSK) protocol and (ii) a quadrature amplitude modulation (QAM) protocol, the second audio transmission to extract the second analog audio signal.

In a ninth aspect according to the first through eighth aspects, the method further includes receiving, from a computing device, a second audio transmission containing a second audio signal and determining, based on the second audio transmission, that a movement speed of the computing device is less than a predetermined threshold. The method may also include selecting at least one of (i) a phase-shift keying (PSK) protocol and (ii) a quadrature amplitude modulation (QAM) protocol for use in generating subsequent audio transmissions.

In a tenth aspect according to the ninth aspect, the predetermined threshold is greater than or equal to 2 inches/second.

In an eleventh aspect according to the tenth aspect, the predetermined threshold is greater than or equal to 4 inches/second.

In a twelfth aspect according to any of the first through eleventh aspects, the method further includes receiving a second audio transmission containing a second audio signal and determining that a signal-to-noise ratio for the second audio transmission exceeds a predetermined threshold. The method may also include selecting a phase-shift keying protocol for use in generating subsequent audio transmissions.

In a thirteenth aspect, a system is provided that includes a processor and a memory. The memory may store instructions which, when executed by the processor, cause the processor to receive a digital data bitstream for a first audio transmission generated to transmit data and divide the digital data bitstream into a plurality of symbols. The instructions may further cause the processor to generate a first analog audio signal that encodes the plurality of symbols as phase differences according to a differential phase-shift keying (DPSK) protocol and transmit, using an audio transmitter, a first audio transmission containing the first analog audio signal.

In a fourteenth aspect according to the thirteenth aspect, the DPSK protocol is a Quad-DPSK (QDPSK) protocol and each of the plurality of symbols is two bits in length.

In a fifteenth aspect according to any of the thirteenth and fourteenth aspects, the DPSK protocol is an 8DPSK protocol and each of the plurality of symbols is three bits in length.

In a sixteenth aspect according to any of the thirteenth through fifteenth aspects, the audio transmission further includes a predetermined portion, wherein at least one of (i) the predetermined portion is encoded according to a phase-shift keying protocol and (ii) the predetermined portion indicates that the first analog audio signal is encoded using the DPSK protocol.

In a seventeenth aspect according to any of the thirteenth through sixteenth aspects, the instructions further cause the processor to receive a second audio transmission containing a second analog audio signal and decode, according to the DPSK protocol, the second audio transmission to extract a second analog audio signal.

In an eighteenth aspect according to the seventeenth aspect, the instructions further cause the processor to determine that the second audio transmission was unsuccessfully decoded using the DPSK protocol and decode, according to at least one of (i) a phase-shift keying (PSK) protocol and (ii) a quadrature amplitude modulation (QAM) protocol, the second audio transmission to extract the second analog audio signal.

In a nineteenth aspect according to any of the thirteenth through eighteenth aspects, the instructions further cause the processor to receive, from a computing device, a second audio transmission containing a second audio signal and determine, based on the second audio transmission, that a movement speed of the computing device is less than a predetermined threshold. The instructions may still further cause the processor to select at least one of (i) a phase-shift keying (PSK) protocol and (ii) a quadrature amplitude modulation (QAM) protocol for use in generating subsequent audio transmissions.

In a twentieth aspect according to any of the thirteenth through nineteenth aspects, the instructions further cause the processor to receive a second audio transmission containing a second audio signal and determine that a signal-to-noise ratio for the second audio transmission exceeds a predetermined threshold. The instructions may still further cause the processor to select a phase-shift keying protocol for use in generating subsequent audio transmissions.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Aspects of the present disclosure relate to transmitting and receiving audio transmissions between devices using various encoding strategies, such as phase-shift keying and differential phase-shift keying strategies. In certain aspects, the encoding strategies may be used to include data in transmitted audio transmissions. In further aspect, the strategies used to encode data may vary depending on the operating conditions between and/or surrounding the devices that are transmitting and receiving audio transmissions.

Various techniques and systems exist to exchange data between computing devices located near one another without connecting to the same communication network. For example, the computing devices may transmit data via direct communication links between the devices. In particular, data may be transmitted according to one or more direct wireless communication protocols, such as Bluetooth®, ZigBee®, Z-Wave®, Radio-Frequency Identification (RFID), Near Field Communication (NFC), and Wi-Fi® (e.g., direct Wi-Fi® links between the computing devices). However, each of these protocols relies on data transmission using electromagnetic waves at various frequencies. Therefore, in certain instances (e.g., ZigBee®, Z-Wave®, RFID, and NFC), computing devices may typically require specialized hardware to transmit data according to these wireless communication protocols. In further instances (e.g., Bluetooth®, ZigBee®, Z-Wave®, and Wi-Fi®), computing devices may typically have to be communicatively paired in order to transmit data according to these wireless communication protocols. Such communicative pairing can be cumbersome and slow, reducing the likelihood that users associated with one or both of the computing devices will utilize the protocols to transmit data.

Figure 1:
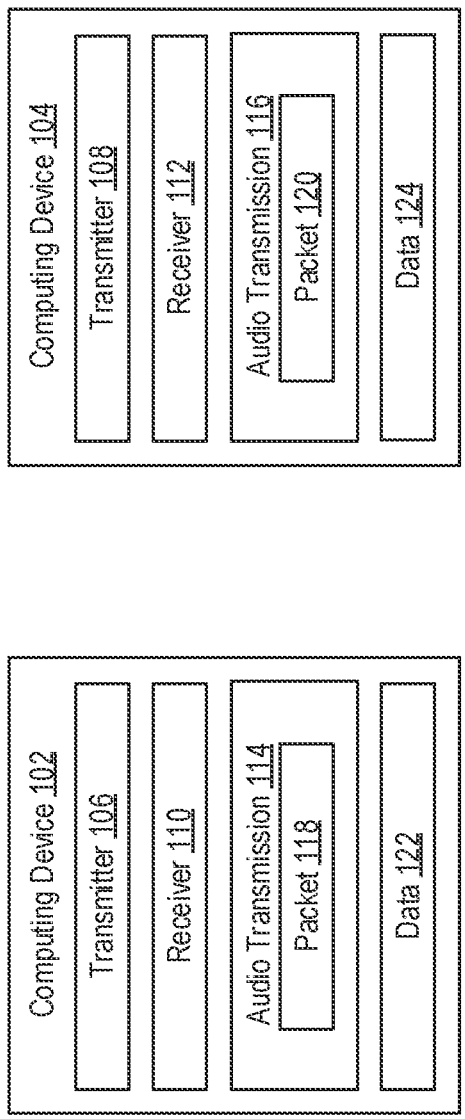
FIG. 1 illustrates a system according to an exemplary embodiment of the present disclosure.

Therefore, there exists a need to wirelessly transmit data in a way that (i) does not require specialized hardware and (ii) does not require communicative pairing prior to data transmission. One solution to this problem is to transmit data using audio transmissions. For example, FIG. 1 illustrates a system 100 according to an exemplary embodiment of the present disclosure. The system 100 includes two computing devices 102, 104 configured to transmit data 122, 124 using audio transmissions 114, 116. In particular, each computing device 102, 104 includes a transmitter 106, 108 and a receiver 110, 112. The transmitters 106, 108 may include any type of device capable of generating audio signals, such as speakers or transducers. In certain implementations, the transmitters 106, 108 may be implemented as a speaker built into the computing device 102, 104. For example, one or both of the computing devices may be a smartphone, tablet computer, and/or laptop with a built-in speaker that performs the functions of the transmitter 106, 108. In other implementations, the transmitters 106, 108 may be implemented as a speaker or transducer external to the computing device 102, 104. For example, the transmitters 106, 108 may be implemented as one or more speakers or transducers externally connected to the computing device 102, 104. In still further implementations, transmitters 106, 108 may be communicatively separate from computing devices.

The receivers 110, 112 may include any type of device capable of receiving audio transmissions and converting the audio transmissions into signals (e.g., analog signals, digital signals) capable of being processed by a processor of the computing device, such as microphones. In other implementations, the receivers 110, 112 may be implemented as a microphone built into the computing device 102, 104. For example, one or both of the computing devices may be a smartphone, tablet computer, and/or laptop with a built-in microphone that performs the functions of the receivers 110, 112. In other implementations, the receivers 110, 112 may be implemented as a microphone external to the computing device 102, 104. For example, the receivers 110, 112 may be implemented as one or more microphones external to the computing device 102, 104 that are communicatively coupled to the computing device 102, 104. In certain implementations, the transmitter 106, 108 and receiver 110, 112 may be implemented as a single device connected to the computing device. For example, the transmitter 106, 108 and receiver 110, 112 may be implemented as a single device containing at least one speaker and at least one microphone that is communicatively coupled to the computing device 102, 104.

In certain implementations, one or both of the computing devices 102, 104 may include multiple transmitters 106, 108 and/or multiple receivers 110, 112. For example, the computing device 104 may include multiple transmitters 108 and multiple receivers 112 arranged in multiple locations so that the computing device 104 can communicate with the computing device 102 in multiple locations (e.g., when the computing device 102 is located near at least one of the multiple transmitters 108 and multiple receivers 112. In additional or alternative implementations, one or both of the computing devices 102, 104 may include multiple transmitters 106, 108 and/or multiple receivers 110, 112 in a single location. For example, the computing device 104 may include multiple transmitters 108 and multiple receivers 112 located at a single location. The multiple transmitters 108 and multiple receivers 112 may be arranged to improve coverage and/or signal quality in an area near the single location. For example, the multiple transmitters 108 and multiple receivers 112 may be arranged in an array or other configuration so that other computing devices 102 receive audio transmissions 114, 116 of similar quality regardless of their location relative to the transmitters 108 and receivers 112 (e.g., regardless of the location of the computing devices 102 within a service area of the transmitters 108 and receivers 112).

The computing devices 102, 104 may generate audio transmissions 114, 116 to transmit data 122, 124 to one another. For example, the computing devices 102 may generate one or more audio transmissions 114 to transmit data 122 from the computing device 102 to the computing device 104. As another example, the computing device 104 may generate one or more audio transmissions 116 to transmit data 124 from the computing device 104 to the computing device 102. In particular, the computing devices 102, 104 may create one or more packets 118, 120 based on the data 122, 124 (e.g., including a portion of the data 122, 124) for transmission using the audio transmissions 114, 116. To generate the audio transmission 114, 116, the computing devices 102, 104 may modulate the packets 118, 120 onto an audio carrier signal. The computing devices 102, 104 may then transmit the audio transmission 114, 116 via the transmitter 106, 108, which may then be received by the receiver 110, 112 of the other computing devices 102, 104. In certain instances (e.g., where the data 122, 124 exceeds a predetermined threshold for the size of a packet 118, 120), the data 122, 124 may be divided into multiple packets 118, 120 for transmission using separate audio transmissions 114, 116.

Accordingly, by generating and transmitting audio transmissions 114, 116 in this way, the computing devices 102, 104 may be able to transmit data 122, 124 to one another without having to communicatively pair the computing devices 102, 104. Rather, a computing device 102, 104 can listen for audio transmissions 114, 116 received via the receivers 110, 112 from another computing device 102, 104 without having to communicatively pair with the other computing device 102, 104. Also, because these techniques can utilize conventional computer hardware like speakers and microphones, the computing devices 102, 104 do not require specialized hardware to transmit the data 122, 124.

Figure 2:
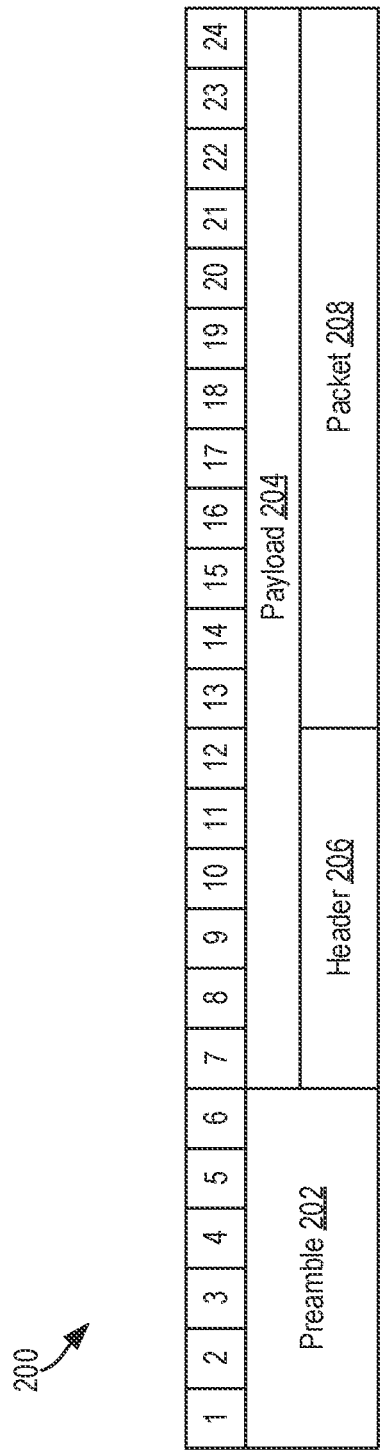
FIG. 2 illustrates an audio transmission according to an exemplary embodiment of the present disclosure.

FIG. 2 illustrates an audio transmission 200 according to an exemplary embodiment of the present disclosure. The audio transmission 200 may be used to transmit data from one computing device to another computing device. For example, referring to FIG. 1, the audio transmission 200 may be an example implementation of the audio transmissions 114, 116 generated by the computing devices 102, 104. The audio transmission 200 includes multiple symbols 1-24, which may correspond to discrete time periods within the audio transmission 200. For example, each symbol 1-24 may correspond to 2 ms of the audio transmission 200. In other examples, the symbols 1-24 may correspond to other durations of the audio transmission 200 (e.g., 1 ms, 10 ms, 20 ms, 40 ms). Each symbol 1-24 may include one or more frequencies used to encode information within the audio transmission 200. For example, the one or more frequencies may be modulated in order to encode information in the audio transmission 200 (e.g., certain frequencies may correspond to certain pieces of information). In another example, the phases of the frequencies may additionally or alternatively be modulated in order to encode information in the audio transmission 200 (e.g., certain phase differences from a reference signal may correspond to certain pieces of information).

In particular, certain symbols 1-24 may correspond to particular types of information within the audio transmission 200. For example, the symbols 1-6 may correspond to a preamble 202 and symbols 7-24 may correspond to a payload 204. The preamble 202 may contain predetermined symbols produced at predetermined points of time (e.g., by varying one or more of the frequency and the phase in a predetermined manner for the frequencies 1-6). The preamble 202 may be used to identify the audio transmission 200 to a computing device receiving the audio transmission 200. For example, a receiver of the computing device receiving audio transmissions such as the audio transmission 200 may also receive other types of audio data (e.g., audio data from environmental noises and/or audio interference). The preamble 202 may therefore be configured to identify audio data corresponding to the audio transmission 200 when received by the receiver of the computing device. In particular, the computing device may be configured to analyze incoming audio data from the receiver and to disregard audio data that does not include the preamble 202. Upon detecting the preamble 202, the computing device may begin receiving and processing the audio transmission 200. The preamble may also be used to align processing of the audio transmission 200 with the symbols 1-24 of the audio transmission 200. In particular, by indicating the beginning of the audio transmission 200 (or another predetermined portion of the audio transmission 200), the preamble 202 may enable the computing device receiving the audio transmission 200 to properly align its processing of the audio transmission with the symbols 1-24.

The payload 204 may include the data intended for transmission, along with other information enabling proper processing of the data intended for transmission. In particular, the packets 208 may contain data desired for transmission by the computing device generating the audio transmission 200. For example, and referring to FIG. 1, the packet 208 may correspond to the packets 118, 120 which may contain all or part of the data 122, 124. The header 206 may include additional information for relevant processing of data contained within the packet 208. For example, the header 206 may include routing information for a final destination of the data (e.g., a server external to the computing device receiving the audio transmission 200). The header 206 may also indicate an originating source of the data (e.g., an identifier of the computing device transmitting the audio transmission 200 and/or a user associated with the computing device transmitting the audio transmission 200).

Symbols 1-24 and their configuration depicted in FIG. 2 are merely exemplary. It should be understood that certain implementations of the audio transmission 200 may use more or fewer symbols, and that one or more of the preamble 202, the payload 204, the header 206, and/or the packet 208 may use more or fewer symbols than those depicted and may be arranged in a different order or configuration within the audio transmission 200.

The above-described techniques may be used to transmit data between computing devices. In particular, different modulation techniques can be used to encode digital data within audio transmissions (e.g., onto audio carrier frequencies) to facilitate transmission of the audio transmissions between the computing devices. However, the accuracy of the data transmitted by the audio transmissions may depend on the modulation techniques used. For example, different types of phase-shift keying (PSK) modulation techniques may be better suited to different types of audio environments. For example, and as explained further below, conventional PSK techniques may be used to encode digital data as particular phases within an audio transmission. However, PSK techniques may suffer from a lack of accuracy when computing devices communicating via audio transmission are or moving relative to one another. Therefore, there exists a need to encode data within audio transmissions using techniques capable of accurate transmissions when computing devices are moving relative to one another.

One solution to this problem is to use differential phase-shift keying (DPSK) modulation techniques to encode digital data within audio transmissions. As explained further below, DPSK techniques may encode digital data as phase differences between consecutive symbols of an analog audio signal within an audio transmission. DPSK techniques may be less susceptible to phase changes introduced by moving computing devices, and may therefore result in more accurate data transmission between moving computing devices.

Another solution to this problem is to use quadrature amplitude modulation (QAM) techniques to encode digital data within audio transmissions. QAM techniques may encode digital data within the phase and the magnitude of symbols of an analog audio signal within an audio transmission. Because QAM techniques use both phase and magnitude instead of just the phase of an audio signal, QAM techniques may have increased data transmission rates compared to PSK and DPSK techniques.

However, DPSK techniques may be less suitable to situations with high levels of environmental noise. Similarly, QAM techniques may only be effective over shorter ranges when compared to PSK and DPSK techniques. Therefore, there may exist a need to dynamically switch between PSK, DPSK, and QAM modulation techniques and to coordinate changes in modulation techniques between computing devices. One solution to this problem is to determine when environmental noise exceeds a predetermined threshold and/or when movement speeds between computing devices exceed a predetermined threshold. If the environmental noise exceeds the predetermined threshold, PSK encoding techniques may be used. Additionally or alternatively, if the movement speed between the computing devices exceeds the predetermined threshold, DPSK encoding techniques may be used. As another example, a distance may be measured between two computing devices that are communicating using audio transmissions. If the distance is less than a predetermined threshold, QAM encoding techniques may be used. If the distances is greater than the predetermined threshold, PSK or DPSK techniques may be used. When an audio transmission is received by a computing device, the computing device may first decode the audio transmission according to a previously-selected protocol (e.g., a DPSK protocol). If the DPSK protocol successfully decodes the transmission, contents of the audio transmission may be processed. If the DPSK protocol does not successfully decode the audio transmission, the computing device may decode the audio transmission according to a different protocol. For example, the different protocol may be a PSK protocol, a QAM protocol, and/or a different type of DPSK protocol.

Figure 3A:
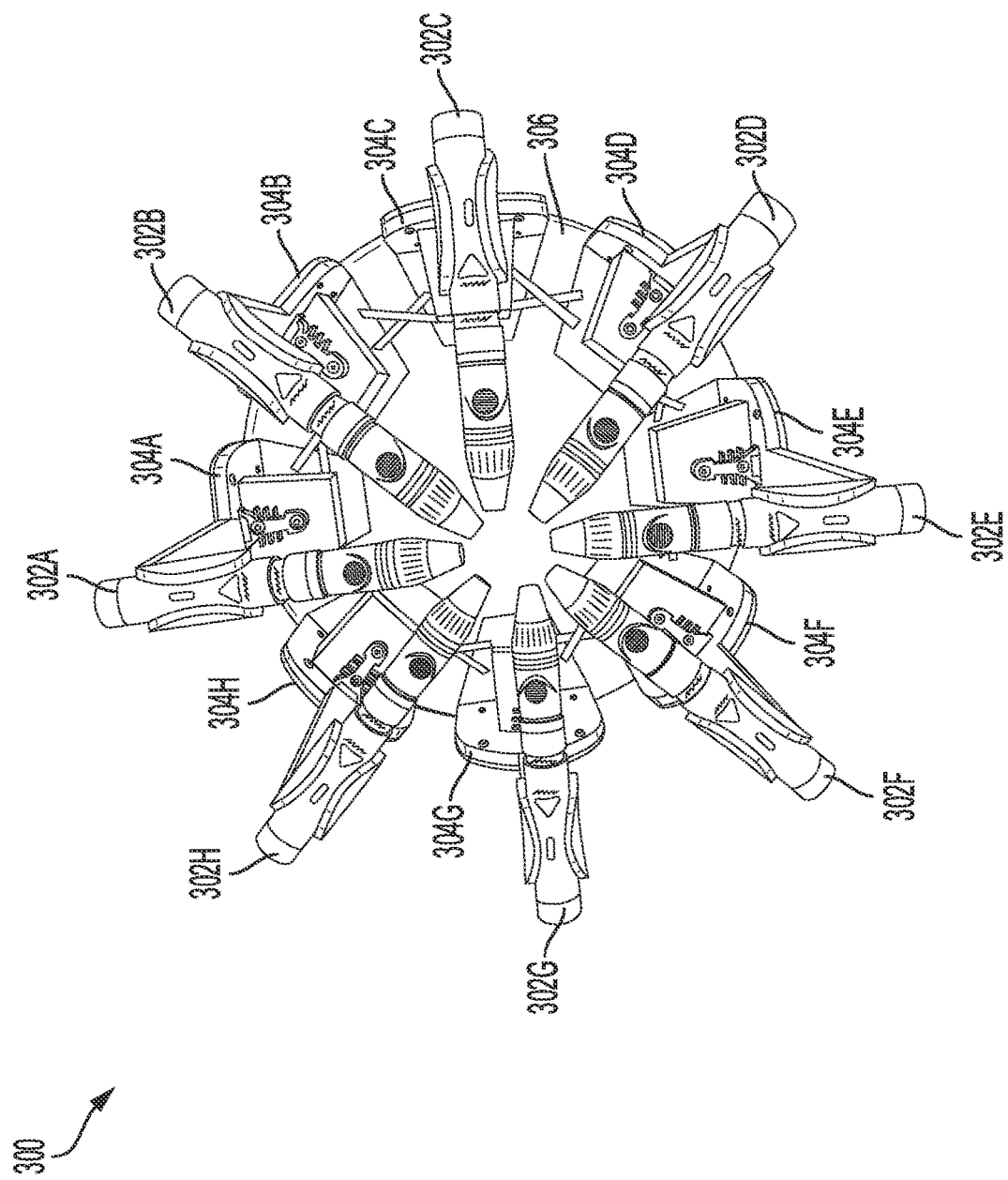
FIGS. 3A-3B illustrate a transmitter/receiver array according to an exemplary embodiment of the present disclosure.
Figure 3B:
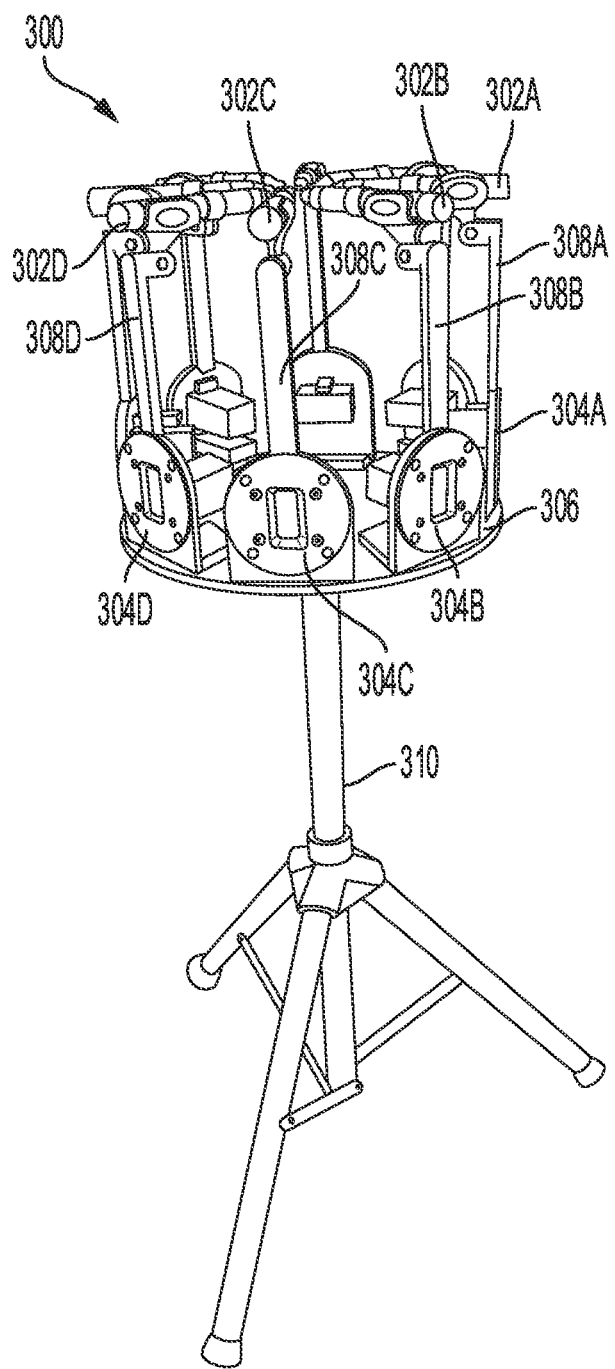

FIGS. 3A-3B illustrate a transmitter/receiver array 300 according to an exemplary embodiment of the present disclosure. The transmitter/receiver array 300 may be used to transmit and/or receive audio transmissions 114, 116, 200. For example, the transmitter/receiver array 300 may be an exemplary implementation of at least one of the computing devices 102, 104. The transmitter/receiver array 300 includes eight receivers 302A-H and eight transmitters 304 A-H. Each of the eight receivers 302A-H may be exemplary implementations of the receivers 110, 112. For example, the eight receivers 302A-H may be implemented as microphones. Each of the eight transmitters 304A-H may be exemplary implementations of the transmitters 106, 108. For example, the eight transmitters 304A-H may be implemented as speakers.

As depicted, the receivers 302A-H and the transmitters 304A-H are arranged to evenly cover a 360° area surrounding the transmitter/receiver array 300. For example, the receivers 302A-H and transmitters 304A-H are arranged so that there is approximately 45° between adjacent receivers 302A-H and adjacent transmitters 304A-H. Such a configuration may enable the transmitter/receiver array 300 to receive audio transmissions 114, 116, 200 from and transmit audio transmissions 114, 116, 200 in multiple directions within a coverage area of the transmitter/receiver array 300. The transmitter/receiver array 300 may be configured to receive and transmit audio transmissions 114, 116, 200 from computing devices located within the coverage area of the transmitter/receiver array 300. For example, FIG. 4B illustrates a scenario 410 in which a computing device 412 (e.g., a mobile device) transmits audio transmissions 414 to the transmitter/receiver array 300 and receives audio transmissions 416 from the transmitter/receiver array 300.

Returning to FIGS. 3A-3B, the receivers 302A-H and the transmitters 304A-H may be mounted on a support body 306. The support body 306 may allow the transmitter/receiver array 300 to be positioned and configured without altering the relative orientation of the receivers 302A-H and the transmitters 304A-H. In certain implementations, the receivers 302A-H may be mounted such that the receivers 302A-H are separated from the transmitters 304A-H (e.g., so that the receivers 302A-H can avoid interference from the transmitters 304A-H). For example, the receivers 302A-H may be mounted on structural members 308A-D (only a subset of which are depicted in FIG. 3B) that separate the receivers 302A-H from the transmitters 304A-H. In certain implementations, the transmitter/receiver array 300 may be mounted on a support element, such as the support element 310. The support element 310 may raise the transmitter/receiver array 300 from the ground such that the transmitter/receiver array 300 is at a height better suited to receiving and transmitting audio transmission 200 (e.g., at or between chest and waist height for a typical individual). Additionally or alternatively, the transmitter/receiver array 300 may be mounted on a table, counter, or ceiling (e.g., in a retail establishment).

It should be appreciated that additional or alternative implementations of the transmitter/receiver array 300 are possible. For example, alternative implementations may have more or fewer transmitters and/or receivers and/or may have larger or smaller transmitters and/or receivers. As another example, alternative implementations may omit one or more of the support body 306, the structural members 308A-D, and/or the support elements 310. As yet another example, alternative implementations may further include a housing surrounding the transmitters 304A-H and/or receivers 302A-H.

Figure 4A:
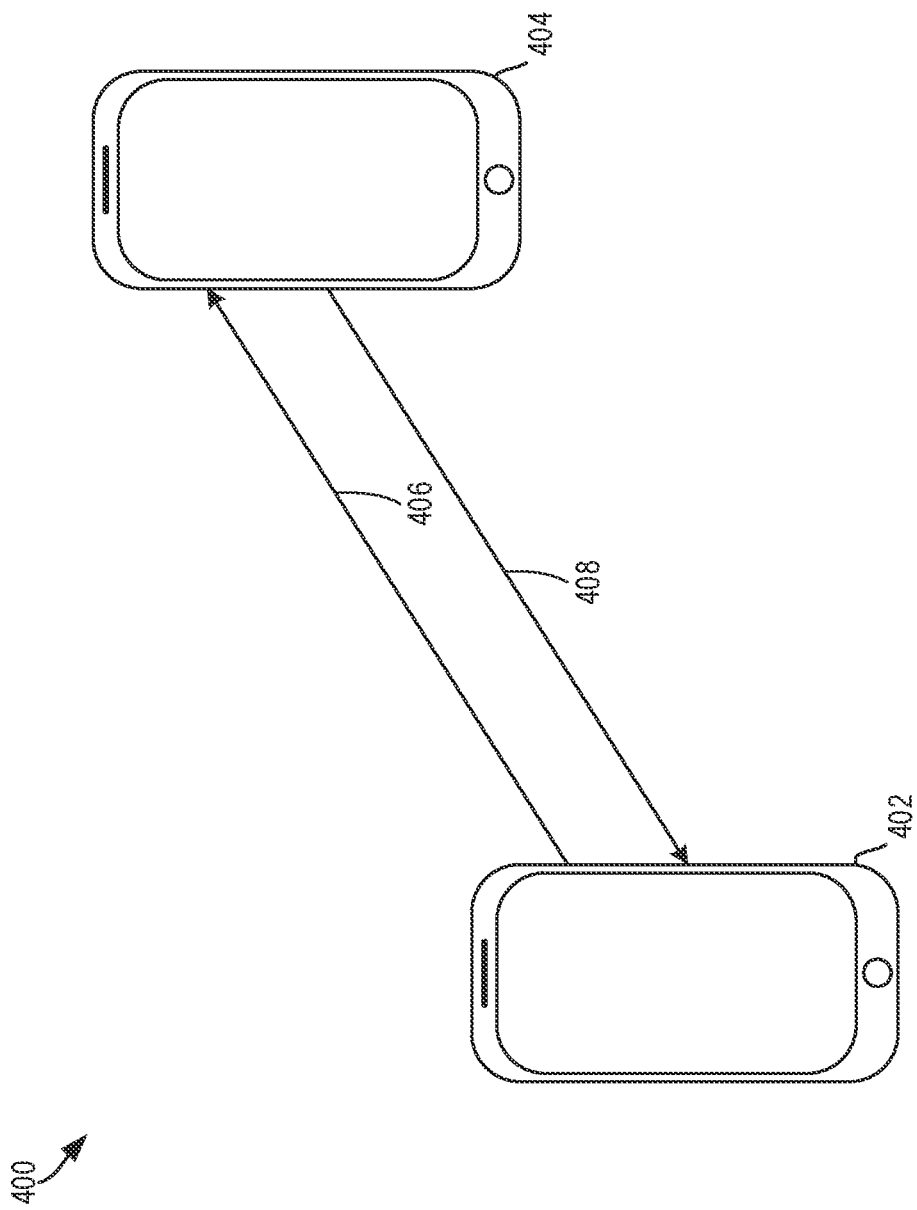
FIGS. 4A-4B illustrate audio transmission scenarios according to exemplary embodiments of the present disclosure.
Figure 4B:
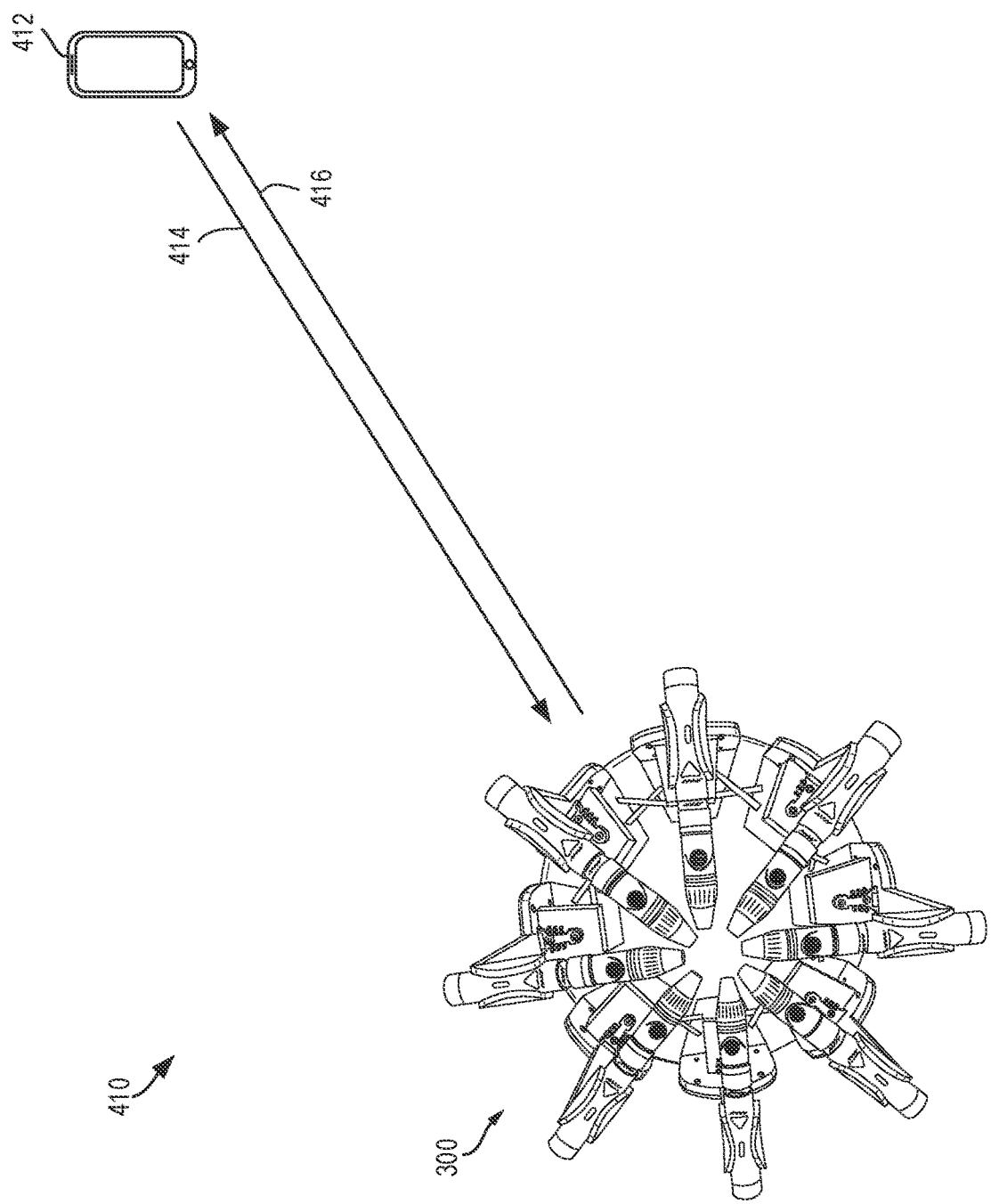

FIG. 4A illustrates an audio transmission scenario 400 according to exemplary embodiments of the present disclosure. In the scenario 400, a computing device 402 transmits an audio transmission 406 to the computing device 404. The computing device 404 also transmits an audio transmission 408 to the computing device 402. As depicted, both of the computing devices 402, 404 are mobile devices (e.g., smartphones). Accordingly, the audio transmissions 406, 408 may be transmitted using speakers of the mobile devices and may be received using microphones of the mobile devices. In certain implementations, the audio transmissions 406, 408 may be transmitted at different times. For example, the computing device 402 may transmit the audio transmission 406 before the computing device 404 transmits the audio transmission 408. In other implementations, the audio transmissions 406, 408 may be transmitted at least partially at the same time. In such instances, the audio transmissions 406, 408 may be transmitted on different channels (e.g., using different carrier frequencies), as explained further below.

Figure 5:
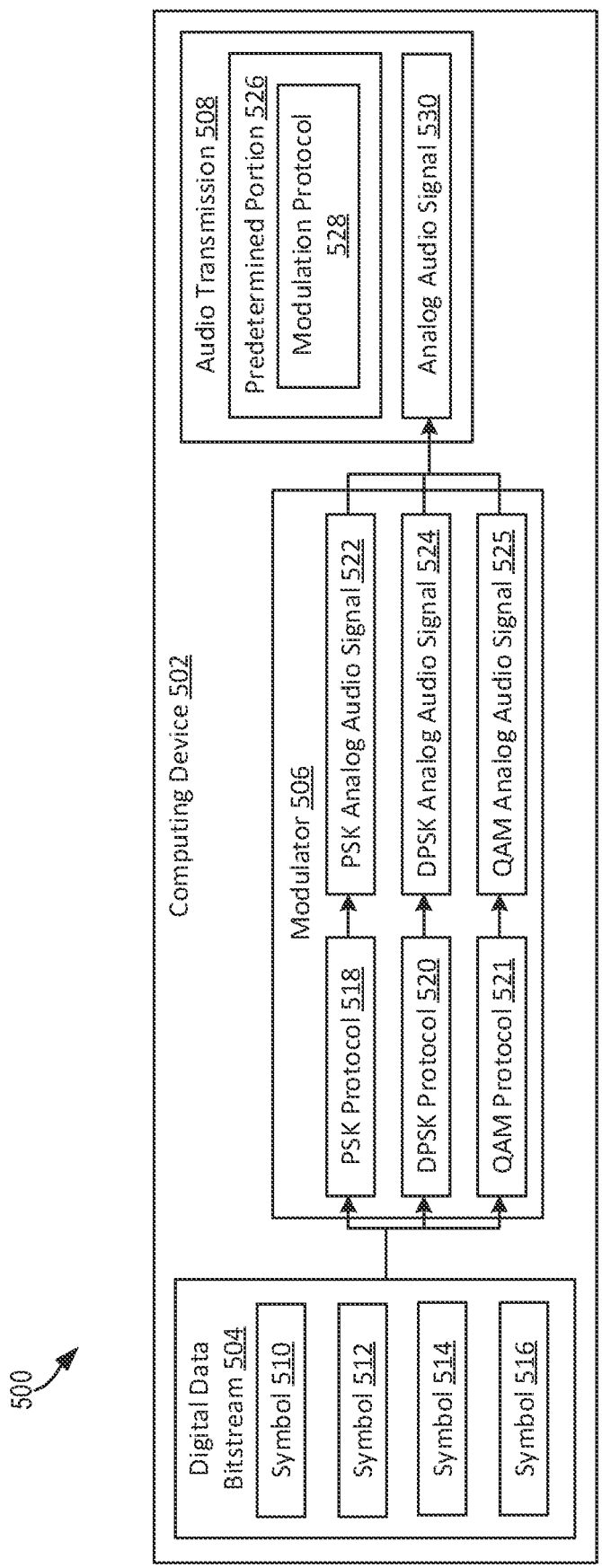
FIG. 5 illustrates a system for generating audio transmissions based on digital data bitstreams according to an exemplary embodiment of the present disclosure.

FIG. 5 illustrates a system 500 for generating audio transmissions based on digital data bitstreams according to an exemplary embodiment of the present disclosure. The system 500 includes a computing device 502, which may be configured to generate and transmit audio transmissions 508. For example, the computing device 502 may transmit audio transmissions 508 using one or more transmitters 106, 108, 304A-H. In addition to the audio transmission 508, the computing device 502 includes a digital data bitstream 504 and a modulator 506.

The digital data bitstream 504 may be generated to include a digital copy of data transmitted using the audio transmission 508. For example, the digital data bitstream 504 may include an identifier of a user of the computing device 502, payment data for transactions performed by the computing device 502, patient data associated with the computing device 502, and the like. The digital data bitstream 504 may contain all of the data to be transmitted by the 502. Additionally or alternatively, multiple audio transmissions 508 may be necessary to transmit the data, and the digital data bitstream 504 represents a portion of the data, such as a packet 118, 120, 208.

The modulator 506 may be configured to modulate the digital data bitstream onto an analog carrier signal to encode the digital data bitstream 504 within an audio signal that can be transmitted using the audio transmission 508. In particular, the modulator 506 may contain one or more protocols 518, 520, 521 (e.g., one or more modulation protocols that may be used in different instances to modulate the digital data bitstream 504). The protocols may define a mapping between particular audio signal characteristics (e.g., frequency, phase, phase difference, magnitude) and particular digital data symbols. Specifically, the modulator 506 includes a phase-shift keying (PSK) protocol 518, a differential phase-shift (DPSK) protocol 520, and a quadrature amplitude modulation (QAM) protocol 521. Each protocol 518, 520, 521 may have a corresponding analog audio signal 522, 524, 525, which is generated by the modulator 506. Specifically, the modulator 506 generates a PSK analog audio signal 522 based on the PSK protocol 518, a DPSK analog audio signal 524 based on the DPSK protocol 520, and a QAM analog audio signal 525 based on the QAM protocol 521. In certain instances, the modulator 506 may be configured to generate a single analog audio signal 522, 524, 525 according to a single protocol 518, 520, 521. In other instances, the modulator 506 may generate multiple analog audio signals 522, 524, 525 based on multiple protocols 518, 520, 521.

In certain instances, the modulator 506 may switch between protocols 518, 520, 521 based on operating conditions (e.g., between the computing device 502 and another computing device to which the audio transmission 508 is transmitted and/or from which audio transmissions are received). For example, DPSK techniques may be superior for use with audio transmissions when two computing devices are moving relative to one another. In particular, for movement speeds greater than 2 inches/second or more (e.g., greater than 4 inches/second, greater than 6 inches/second) may introduce errors in audio transmissions that include PSK analog audio signals. Accordingly, when computing devices move relative to one another with sufficient movement speed, DPSK protocols 520 may be used to reduce errors and improve processing accuracy. As another example, PSK techniques may be superior in situations with high levels of noise (e.g., environmental noise or other audio interference within an audio channel used to communicate between two computing devices). For instance, as explained further below, the DPSK protocol 520 may encode data symbols based on a difference in phase between consecutive symbols of the DPSK analog audio signal 524. Accordingly, accurate processing of a symbol relies on accurate copies of both of the consecutive symbols, or at least copies with copies with correlated interference. This reliance on multiple symbols may magnify the negative effects of noise affecting the symbols. Therefore, when computing devices are communicating in an environment with lots of noise, PSK protocols 518 may be used to reduce errors and improve processing accuracy. As a still further example, because PSK protocols 518 are less impacted by environmental noise, PSK protocols 518 may be superior for transmitting over longer distances (e.g., greater than 20 feet). Accordingly, when computing devices are communicating over longer distances, PSK protocols 518 may be used to reduce errors and improve processing accuracy. As a further example, QAM protocols 521 may be able to increase data throughput, as more bits can be encoded for each symbol of an audio transmission. However, because QAM protocols 521 require accurate determination of both the amplitude and the phase of received symbols, QAM protocols 521 may be more error prone in situations with high environmental noise, or where communicating computing devices are far apart.

The digital data bitstream 504 includes multiple symbols 510, 512, 514, 516, which may represent portions of the digital data bitstream 504 that are separately encoded within the analog audio signals 522, 524. For example, as explained further below, each symbol 510, 512, 514, 516 may be encoded within PSK analog audio signals 522 as the phases of portions (or "symbols") of the PSK analog audio signal 522. As another example, each symbol 510, 512, 514, 516 may be encoded within DPSK analog audio signals 524 as phase differences between consecutive portions (or "symbols") of the DPSK analog audio signal 524. As a further example, each symbol 510, 512, 514, 516 may be encoded within QAM analog audio signals 525 as a combined phase and magnitude of portions (or "symbols") of the QAM analog audio signal 525. In practice, the symbols 510, 512, 514, 516 may differ based on the protocol 518, 520, 521. For example, each of the protocols 518, 520 may encode symbols 510, 512, 514, 516 of different lengths. As a specific example, the PSK protocol 518 may encode three-bit symbols 510, 512, 514, 516, the DPSK protocol 520 may encode two-bit symbols 510, 512, 514, 516, and the QAM protocol 521 may encode four-bit symbols 510, 512, 514, 516. In certain such instances, the protocols 518, 520, 521 may receive the digital data bitstream 504 as a continuous series of bits and may divide the digital data bitstream 504 into separate symbols 510, 512, 514, 516 based on the size of symbols 510, 512, 514, 516 used by the protocol 518, 520, 521.

As explained above, PSK protocols 518, DPSK protocols 520, and QAM protocols 521 may be advantageously used in different operating conditions. Accordingly, the computing device 502 and/or the modulator 506 may switch between various protocols 518, 520, 521 included within the modulator 506 depending on current operating conditions. For example, the protocol 518, 520, 521 may be switched based on a measurement of noise within a received audio transmission (e.g., a signal-to-noise ratio (SNR) of a received audio transmission), based on a measured movement speed (e.g., a movement speed of one or more computing devices communicating using audio transmissions), and based on a measured distance between computing devices (e.g., a distance measured based on a magnitude of a received audio transmission). In certain instances, switching protocols 518, 520, 521 may include selecting between the analog audio signals 522, 524 generated by the protocols 518, 520, 521. For example, the audio transmission 508 includes an analog audio signal 530, which may include a copy of one of the analog audio signals 522, 524, 525. Accordingly, to switch between the protocols 518, 520, 521, the computing device 502 and/or the modulator 506 may provide a corresponding analog audio signal 522, 524, 525 for use as the analog audio signal 530 of the audio transmission 508. In further instances, only one protocol 518, 520, 521 may be used to generate an analog audio signal 522, 524, 525 at the same time. In such instances, switching protocols 518, 520, 521 may include disabling one protocol 518, 520, 521 and enabling another protocol 518, 520, 521. In still further instances, switching protocols 518, 520, 521 may also include switching between different versions of the same type of protocol 518, 520, 521. For example, a DPSK protocol 520 that uses three-bit symbols may be initially used, and switching protocols may include switching to a different DPSK protocol that uses two-bit symbols. Similar techniques may be used to switch between different types of PSK protocols and/or different types of QAM protocols.

The selected protocol 518, 520, 521 may be used to generate an audio transmission 508 containing at least a subset of the digital data bitstream 504. In particular, the audio transmission 508 includes an analog audio signal 530, which may contain a copy of the analog audio signal 522, 524, 525 for the selected protocol 518, 520, 521. In particular, the analog audio signal 530 may be added to the audio transmission 508 as a packet 208 or a portion of a packet 208 of the audio transmission 508. The audio transmission 508 also includes a predetermined portion 526, which may be implemented similar to the preamble 202 discussed above.

In certain instances, the predetermined portion 526 may also include an indication of the modulation protocol 528 used to encode the digital data bitstream 504 within the analog audio signal 530. For example, the modulation protocol 528 may indicate one or more of a type of modulation (e.g., PSK, DPSK, QAM), a symbol length, and the like. In such instances, a computing device that receives the audio transmission 508 may extract the modulation protocol 528 from the audio transmission and may use a corresponding PSK, DPSK, or QAM protocol 518, 520 521 to demodulate the analog audio signal 530 and extract the digital data bitstream 504.

The computing device 502 may be implemented by a computing system. For example, although not depicted, one or both of the computing device 502 may contain a processor and a memory that implement at least one operational feature. For example, the memory may contain instructions which, when executed by the processor, cause the processor to implement at least one operational feature of the computing device.

Figure 6B:
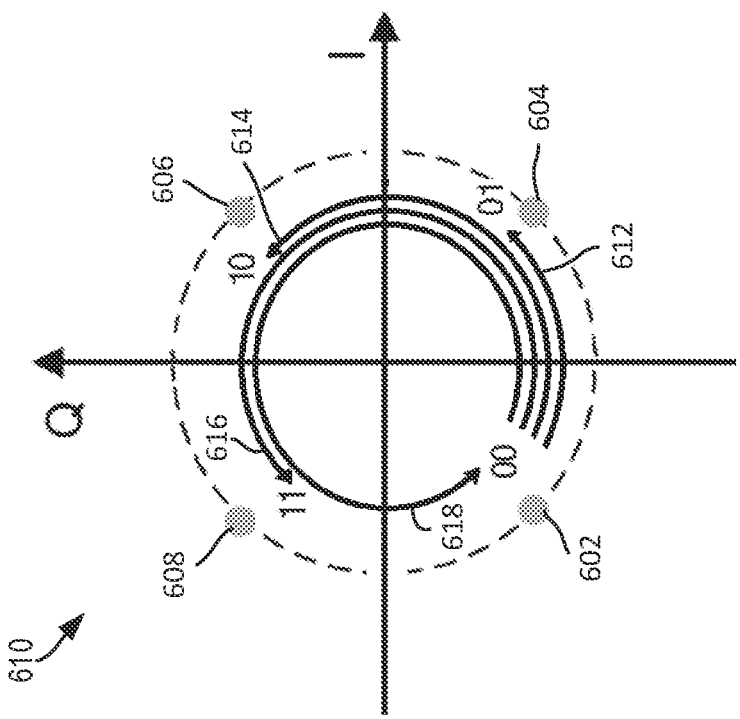
FIGS. 6A-6C illustrate PSK and DPSK modulation protocols according to exemplary embodiments of the present disclosure.
Figure 6A:
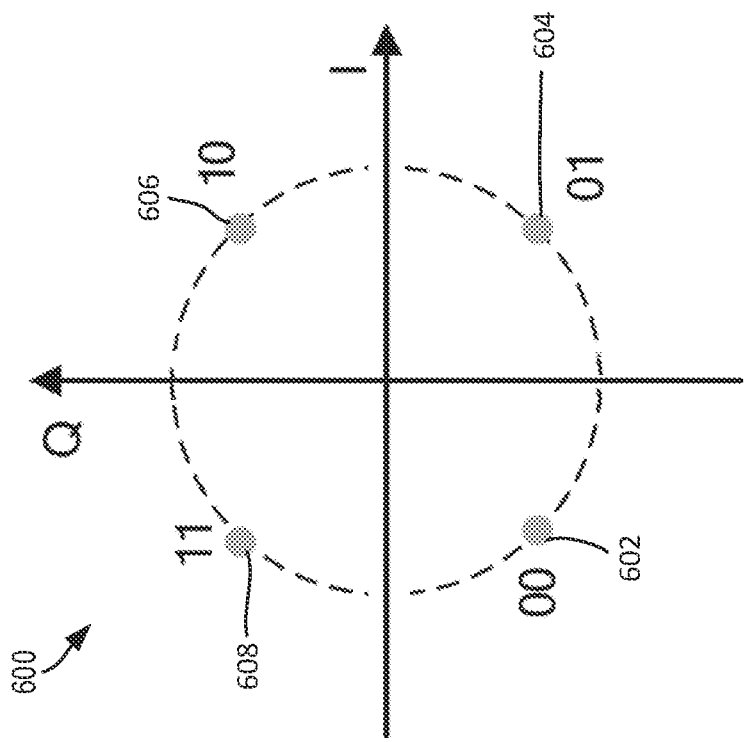
Figure 6C:
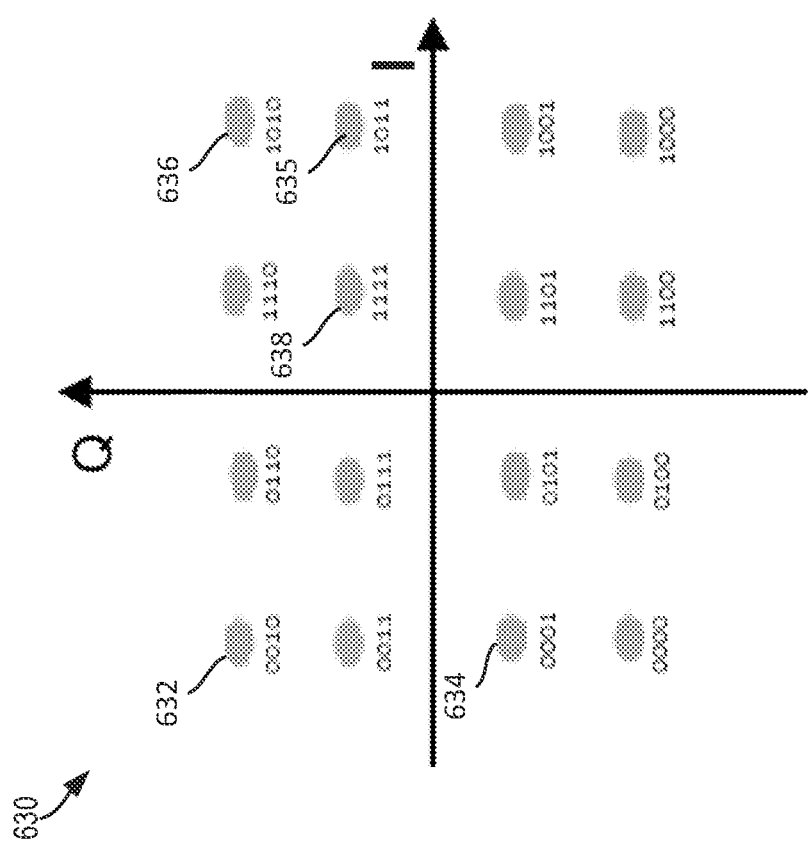

FIGS. 6A-6C illustrate encoding protocols 600, 610, 630 according to exemplary embodiments of the present disclosure. In particular, FIG. 6A depicts a PSK encoding protocol 600, FIG. 6B depicts a DPSK encoding protocol 610, and FIG. 6C depicts a QAM encoding protocol. The encoding protocols 600, 610 may be used to generate analog audio signals 522, 524, 525. For example, the PSK encoding protocol 600 may be an exemplary implementation of the PSK protocol 518, the DPSK encoding protocol 610 may be an exemplary implementation of the DPSK protocol 520, and the QAM encoding protocol may be an exemplary implementation of the QAM protocol 521.

The PSK encoding protocol 600 may encode symbols as particular phases 602, 604, 606, 608 for corresponding symbols within analog audio signals. In particular, FIG. 6A depicts the encoding protocol 600 in a constellation diagram that depicts phases 602, 604, 606, 608 as combinations of an in-phase carrier (I) and a quadrature carrier (Q), where the quadrature carrier is shifted by 90 degrees from the in-phase carrier. In the constellation diagram, different phases 602, 604, 606, 608 may be depicted as different angles within the constellation diagram. In particular, the symbols are each separated by 90 degrees. As a specific example, phase 606 may include positive components of both the in-phase carrier and the quadrature carrier with the same magnitude. A symbol in a corresponding analog audio signal may be encoded according to a corresponding phase 602, 604, 606, 608. As specific example, a symbol containing "00" may be encoded as phase 602, a symbol containing "01" may be encoded as phase 604, a symbol containing "10" may be encoded as phase 606, and a symbol containing "11" may be encoded as phase 608.

As depicted, the PSK protocol 600 encodes two-bit symbols and therefore can encode up to four different types of symbols. Accordingly, the PSK protocol 600 may also be referred to as a Quad-PSK (QPSK) protocol. However, in additional or alternative implementations, PSK protocols may be used that encode longer or shorter symbols. For example, an 8PSK protocol may be used that supports three-bit symbols and can therefore encode up to eight different types of symbols. Symbols in an 8PSK protocol may be separated by 45 degrees on a constellation diagram. As another example, a binary-PSK (BPSK) protocol may be used that supports one-bit symbols and can encode up to two different types of symbols. Symbols in a BPSK protocol may be separated by 180 degrees on a constellation diagram.

The DPSK protocol 610 may encode symbols as differences in phases between consecutive symbols of a corresponding analog audio signal. In particular, similar to FIG. 6A, FIG. 6B depicts the DPSK protocol 610 in a constellation diagram. As shown in the encoding protocol, a symbol containing "00" may be encoded as a phase difference 612 of 90 degrees between consecutive symbols, a symbol containing "01" may be encoded as a phase difference 614 of 180 degrees between consecutive symbols, a symbol containing "10" may be encoded as a phase difference 616 of 270 degrees between consecutive symbols, and a symbol containing "11" may be encoded as a phase difference 618 of 360 degrees (i.e., the same phase) between consecutive symbols. As a specific example, if a previous symbol of an analog audio signal was generated with phase 602, and the next symbol of the digital data bitstream contains "10", the next symbol of the analog audio signal will be generated with a phase difference 614 of 180 degrees at phase 606. As a further example, if the next symbol of the digital data bitstream contains "11", the next symbol of the analog audio signal will be generated with a phase difference 616 of 270 degrees at phase 604.

As depicted, the DPSK protocol 610 encodes two-bit symbols and therefore can encode up to four different types of symbols. Accordingly, the DPSK protocol 610 may also be referred to as a Quad-DPSK (QDPSK) protocol. However, in additional or alternative implementations, DPSK protocols may be used that encode longer or shorter symbols. For example, an 8DPSK protocol may be used that supports three-bit symbols and can therefore encode up to eight different types of symbols. As another example, a binary-DPSK (BDPSK) protocol may be used that supports one-bit symbols and can encode up to two different types of symbols.

The QAM protocol 630 may encode symbols as particular combinations of phases and magnitudes for symbols of a corresponding analog audio signal. In particular, FIG. 6C depicts the QAM protocol 630 in a constellation diagram that depicts symbols 632, 634, 635, 636, 638 (only a subset of which are numbered) as combinations of an in-phase carrier (I) and a quadrature carrier (Q), where the quadrature carrier is shifted by 90 degrees from the in-phase carrier. In the constellation diagram, different phases for symbols may be depicted as different angles within the constellation diagram and different magnitudes may be depicted as different lengths from the origin of the constellation diagram to the symbols 632, 634, 635, 636, 638. For example, symbols 638 and 636 may have the same phase but different magnitudes and symbols 632 and 636 may have the same magnitude but different phases. A symbol in a corresponding analog audio signal may be encoded according to a corresponding phase and magnitude. As a specific example, a symbol containing "1010" may be encoded as the phase and magnitude indicated by symbol 636 (e.g., equal parts of the I and Q carriers with a larger magnitude). As another example, a symbol containing "1111" may be encoded as the phase and magnitude indicated by symbol 638 (e.g., equal parts of the I and Q carriers with a smaller magnitude).

As depicted, the QAM protocol 630 encodes four-bit symbols and therefore can encode up to 16 different types of symbols. Accordingly, the QAM protocol 630 may also be referred to as a 16QAM protocol. However, in additional or alternative implementations, QAM protocols may be used that encode longer or shorter symbols. For example, an 8QAM protocol may be used that supports three-bit symbols and can therefore encode up to eight different types of symbols. As another example, a 32QAM protocol may be used that supports five-bit symbols and can therefore encode up to 32 different types of symbols.

It should also be understood that the PSK, DPSK, and QAM protocols 600, 610, 630 depicted in FIGS. 6A-6C are merely exemplary and that other implementations, including other implementations of QPSK, QDPSK, and 16QAM protocols, may be used. For example, in alternative implementations, a QPSK protocol may be used that includes different phases, or different symbols assigned to each of the phases, than the PSK protocol 600. As another example, in alternative implementations, a QDPSK protocol may be used that includes different phase differences than the DPSK protocol 600. As a further example, in alternative implementations, a 16QAM protocol may be used that includes different combinations of phases and magnitudes than the QAM protocol 630. All such protocols are considered within the scope of the present disclosure.

Figure 7:
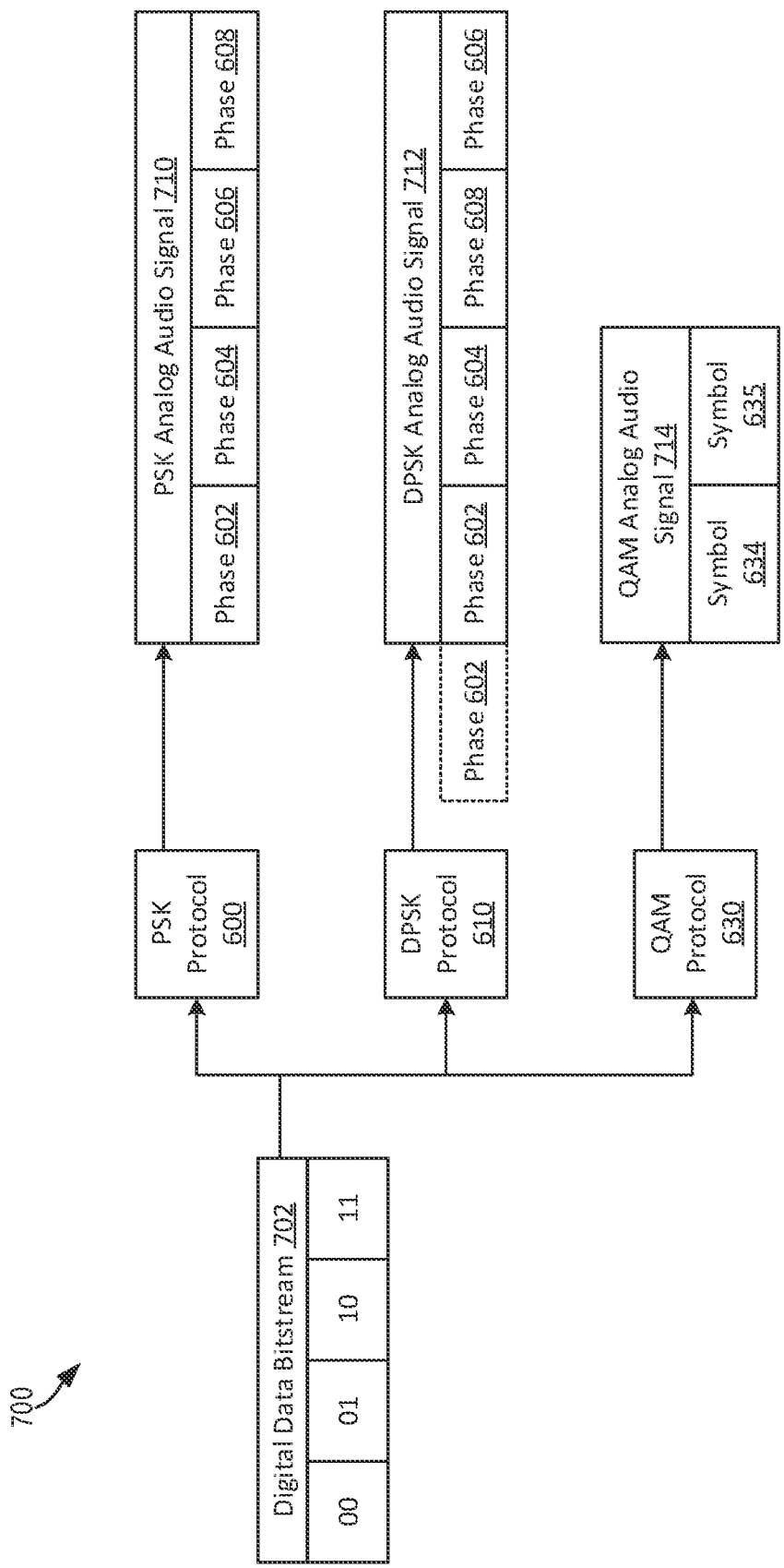
FIG. 7 illustrates an encoding procedure according to an exemplary embodiment of the present disclosure.

FIG. 7 illustrates an encoding procedure 700 according to an exemplary embodiment of the present disclosure. The encoding procedure 700 may be performed to encode a digital data bitstream 702 according to the PSK encoding protocol 600, the DPSK encoding protocol 610, and the QAM encoding protocol 630. For example, the digital data bitstream 702 may be encoded according to the PSK protocol 600 to generate the PSK analog audio signal 710 and the digital data bitstream 702 may be encoded according to the DPSK Protocol 610 to generate the DPSK analog audio signal 712.

The digital data bitstream 702 contains four symbols: a first symbol containing "00", a second symbol containing "01", a third symbol containing "10", and a fourth symbol containing "11". For the PSK protocol 600, each of the symbols is encoded as a particular phase, as reflected in the constellation diagram of FIG. 6A. In particular, the first symbol is encoded as the phase 602, the second symbol is encoded as the phase 604, the third symbol is encoded as the phase 606, and the fourth symbol is encoded as the phase 608. The phases 602, 604, 606, 608 used to encode the symbols according to the PSK protocol 600 may be combined to form the PSK analog audio signal 710. In particular, the phases 602, 604, 606, 608 may be modulated onto a carrier frequency (e.g., an ultrasonic audio carrier frequency of 18 kHz or higher) for sequential time periods of the PSK analog audio signal 710. In particular, each symbol within the digital data bitstream 702 may be represented as a symbol within the PSK analog audio signal 710 of a fixed duration (e.g., a fixed duration of 2 ms, 5 ms, 10 ms, 50 ms). For example, the phases 602, 604, 606, 608 may be applied to sequential 2 ms time periods of the PSK analog audio signal 710.

Turning to the DPSK protocol 610, each of the symbols of the digital data bitstream 702 are encoded as phase differences relative to a preceding symbol within the DPSK analog audio signal 712. For example, suppose a preceding symbol of the DPSK analog audio signal 712 was modulated with the phase 602. The first symbol "00" may be encoded with a phase difference 618 of 360° from the preceding phase 602, resulting in the same phase 602. The second symbol "01" may be encoded with a phase difference 612 of 90° from the preceding phase 602, resulting in the phase 604. The third symbol "10" may be encoded with a phase difference 614 of 180° from the preceding phase 604, resulting in the phase 608. The fourth symbol may be encoded with a phase difference 616 of 270° from the preceding phase 608, resulting in the phase 606. The phases 602, 604, 606, 608 may then be combined to form the DPSK analog audio signal 712 by modulating the phases 602, 604, 606, 608 onto a carrier frequency for sequential time periods of the DPSK analog audio signal 712, using techniques similar to those discussed above.

Turning to the QAM protocol 630, the symbols of the digital data bitstream 702 are encoded as phase and magnitude combinations. In particular, the QAM protocol 630 is a 16QAM protocol, so four bits of data from the digital data bitstream 702 are encoded in each symbol of the QAM analog audio signal 714. The first four bits of data from the digital data bitstream 702 ("0001") may be encoded as the corresponding symbol 634 in the QAM protocol 630 and the final four bits of data ("1011") may be encoded as the corresponding symbol 635 in the QAM protocol 630.

As can be seen in FIG. 7, the protocol 600, 610 result in different analog audio signals 710, 712. Furthermore, as the QAM protocol 630 has a higher data bitrate, the QAM analog audio signal 714 is shorter than the PSK or DPSK analog audio signals 710, 712.

Figure 8:
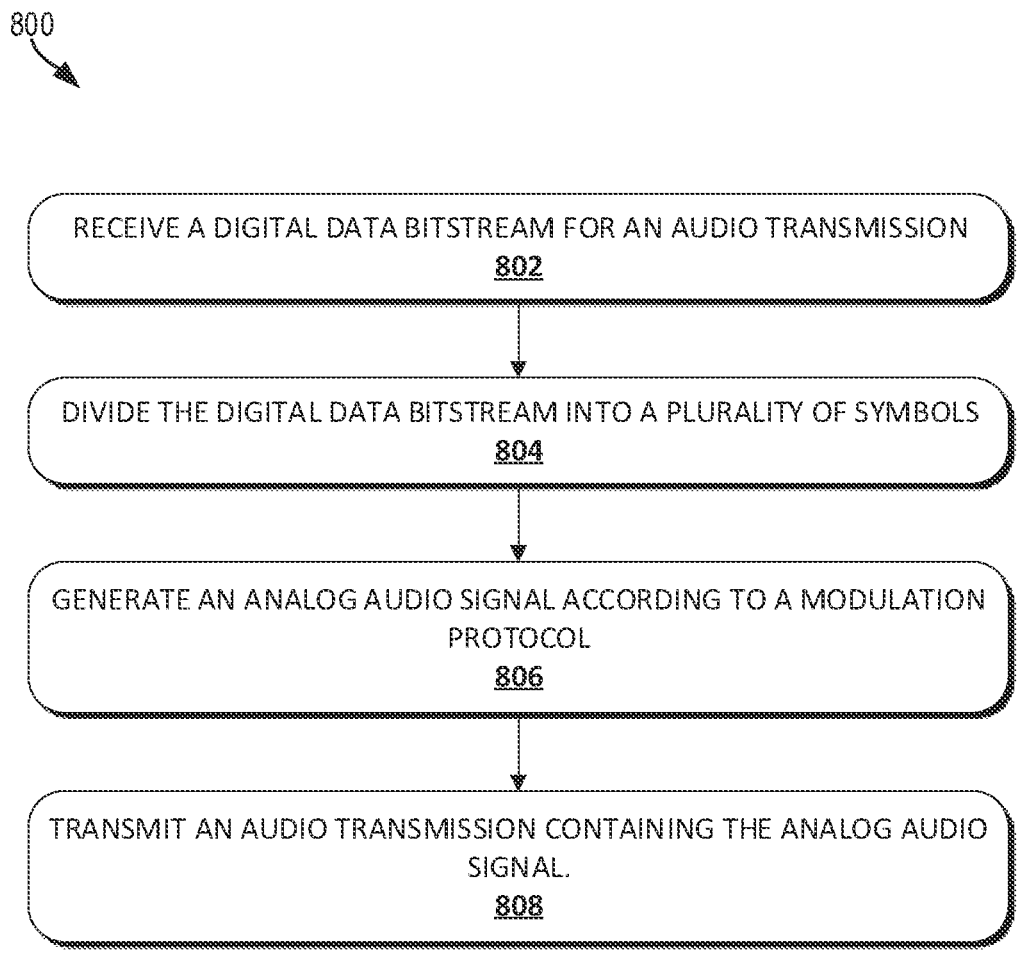
FIG. 8 illustrates a method for generating audio transmissions based on digital data bitstreams according to an exemplary embodiment of the present disclosure.

FIG. 8 illustrates a method 800 for generating audio transmissions based on digital data bitstreams according to an exemplary embodiment of the present disclosure. In particular, the method 800 may be performed to generate audio transmissions that include analog audio signals generated based on digital data bitstreams. The method 800 may be implemented on a computer system, such as the system 500. For example, the method 800 may be implemented by the computing device 502. The method 800 may also be implemented by a set of instructions stored on a computer-readable medium that, when executed by a processor, cause the computer system to perform the method 800. For example, all or part of the method 800 may be implemented by a processor and a memory of the computing device 502. Although the examples below are described with reference to the flowchart illustrated in FIG. 8, many other methods of performing the acts associated with FIG. 8 may be used. For example, the order of some of the blocks may be changed, certain blocks may be combined with other blocks, one or more of the blocks may be repeated, and some of the blocks described may be optional.

The method 800 may begin with receiving a digital data bitstream for an audio transmission (block 802). For example, the computing device 502 may receive a digital data bitstream 504. The digital data bitstream 504 may contain data to be transmitted by the computing device 502 to another computing device. In particular, the digital data bitstream 504 may contain data for transmission by the computing device 502 using an audio transmission 508. The data stored within the digital data bitstream 504 may be stored as binary, digital bits.

The digital data bitstream may be divided into a plurality of symbols (block 804). For example, the computing device 502 may divide the digital data bitstream 504 into a plurality of symbols 510, 512, 514, 516. As explained above, the digital data bitstream 504 may be split into symbols 510, 512, 514, 516 of different lengths. In particular, the length of the symbols 510, 512, 514, 516 may depend on the protocol 518, 520, 600, 610 that will be used to generate an analog audio signal. For example, protocols 518, 520, 600, 610 with a larger number of available symbols or phases may be capable of encoding longer symbols. As a specific example, for an eight symbol protocol (e.g., 8PSK, 8DPSK), the digital data bitstream 504 may be split into symbols 510, 512, 514, 516 that are three bits in length. In certain instances, the digital data bitstream 504 may be split into sequential symbols 510, 512, 514, 516 (e.g., symbols 510, 512, 514, 516 that contain consecutive bits of the digital data bitstream 504). In additional or alternative implementations, the digital data bitstream 504 may be split into nonsequential symbols 510, 512, 514, 516. In certain instances, the digital data bitstream 504 may be split in the symbols 510, 512, 514, 516 by the modulator 506 (e.g., according to a corresponding protocol 518, 520, 521, 600, 610, 630). In still further instances, the digital data bitstream 504 may be split into multiple sets of symbols 510, 512, 514, 516. For example, the modulator 506 may be configured to utilize more than one protocol 518, 520, 521, 600, 610, 630 that are capable of encoding symbols of different lengths (e.g., two-bit symbols, four-bit symbols). In such instances, the digital data bitstream 504 may be split into a first set of two-bit symbols 510, 512, 514, 516 and a second set of four-bit symbols 510, 512, 514, 516.

An analog audio signal may be generated according to a modulation protocol (block 806). For example, the computing device 502 may generate one or more analog audio signals 522, 524, 525, 710, 712, 714 based on one or more modulation protocols 518, 520, 521, 600, 610, 630. The modulation protocol may include a PSK protocol 518, 600, a DPSK protocol 520, 610, and/or a QAM protocol 521, 630. The symbols 510, 512, 514, 516 of the digital data bitstream 504 may be encoded as phases, phase differences, and/or magnitudes of discrete time periods within the analog audio signals 522, 524, 525, 710, 712, 714. For example, the symbols 510, 512, 514, 516 may be encoded using techniques similar to those discussed above in connection with the protocols 600, 610, 630 and the encoding procedure 700. In certain instances, the modulator 506 may be configured to generate a single analog audio signal 522, 524, 525, 710, 712, 714 according to a particular protocol 518, 520, 521, 600, 610, 630. In additional or alternative implementations, the modulator 506 may generate multiple analog audio signals 522, 524, 525, 710, 712, 714 according to multiple protocols 518, 520, 521, 600, 610, 630, as described above.

An audio transmission may be transmitted that contains the analog audio signal (block 808). For example, the computing device 502 may generate an audio transmission 508 that includes an analog audio signal 530. As explained above, the analog audio signal 530 may be configured to contain a copy of an analog audio signal 522, 524, 525, 710, 712, 714 generated by the modulator 506. In particular, the computing device 502 may select between the PSK analog audio signal 522, 710, the DPSK analog audio signal 524, 712, and the QAM analog audio signal 525, 714 based on current operating conditions as explained above and further explained below in connection with the methods 900, 920, 940. The computing device 502 may further generate the audio transmission 508 to contain a predetermined portion 526 that stores an indication of the modulation protocol 528 used to encode the digital data bitstream within the analog audio signal 530.

In this way, the method 800 may enable the computing device 502 to encode digital data bitstreams 504 according to particular modulation protocols. In particular, in certain instances, the method 800 may enable computing devices to utilize DPSK modulation techniques to encode digital data bitstreams within audio transmissions. As explained above, DPSK modulation techniques may enable superior performance when computing devices that communicate using audio transmissions are moving relative to one another. Such techniques may be particularly important when transmitting data using audio transmissions, as the accuracy of the audio transmissions can be adversely impacted at much slower movement speeds than electromagnetic or RF data transmissions. Additionally, in certain instances, the method 800 may enable computing devices to utilize QAM modulation techniques to encode digital data bitstreams within audio transmission. These techniques can increase data throughput in advantageous operating conditions, reducing the overall time required to transmit data using audio transmission and reducing the risk that other sound sources will interfere with data transmission.

Figure 9A:
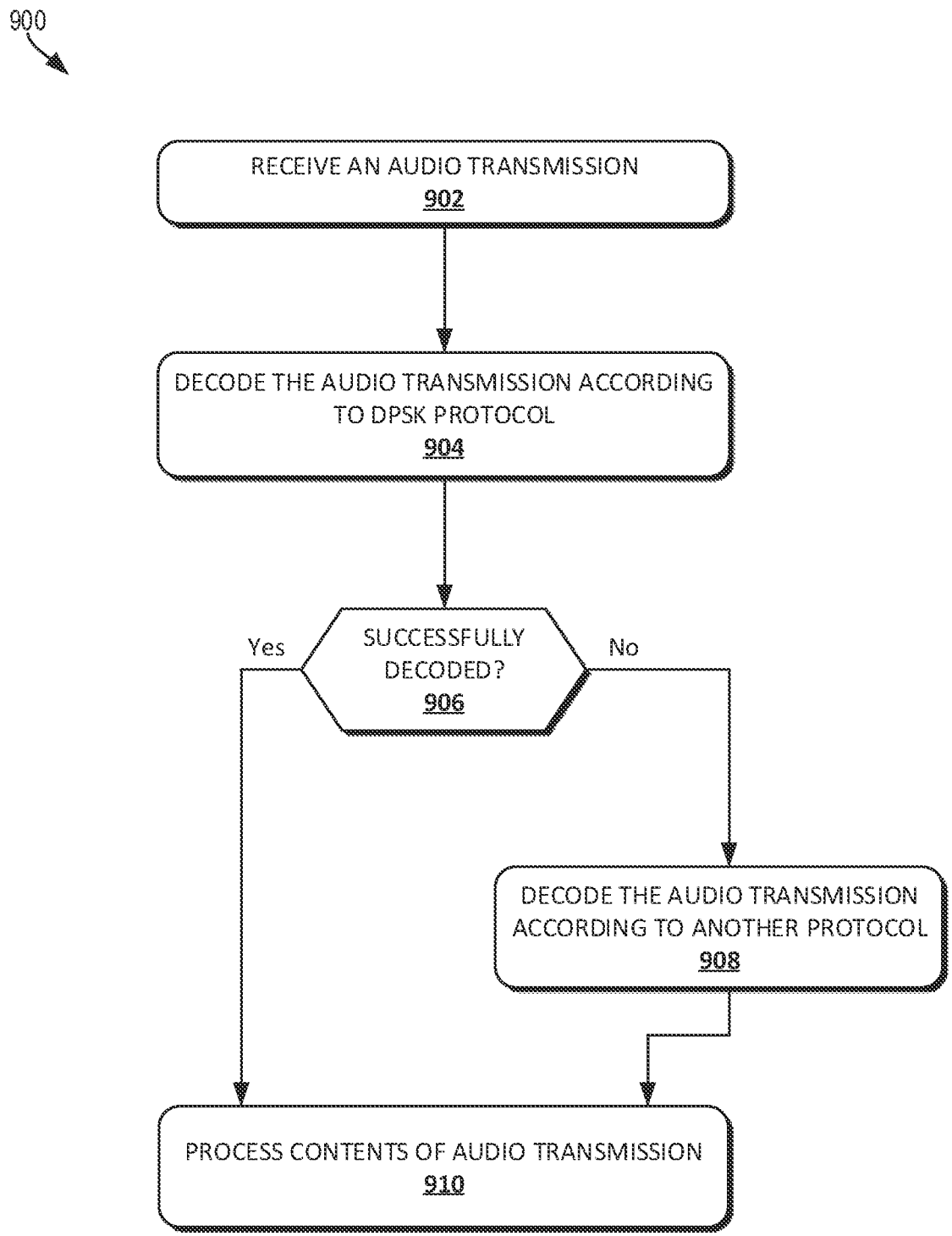
FIGS. 9A-9C illustrate methods for receiving and decoding audio transmissions and selecting modulation protocols according to exemplary embodiments of the present disclosure.
Figure 9B:
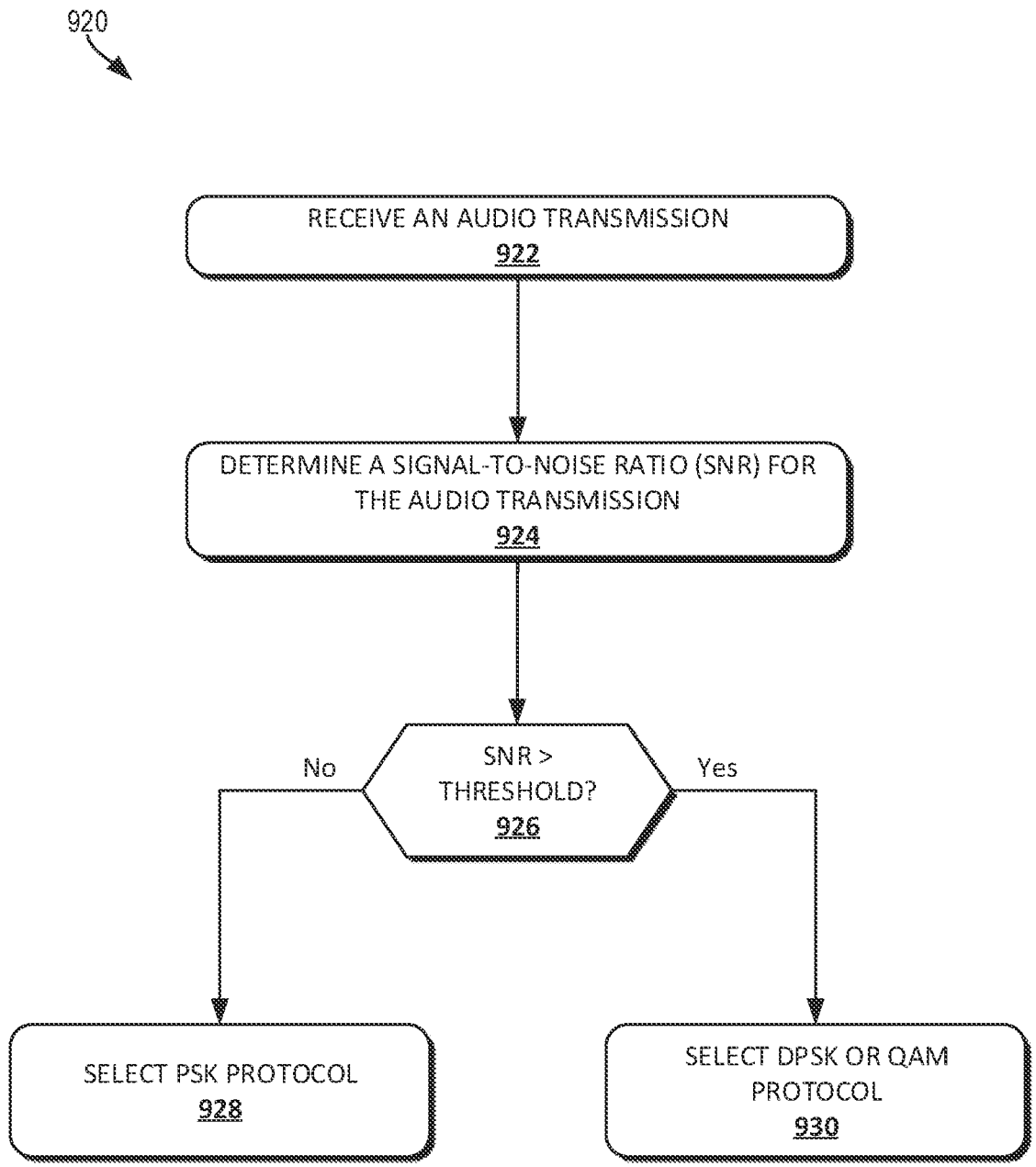
Figure 9C:
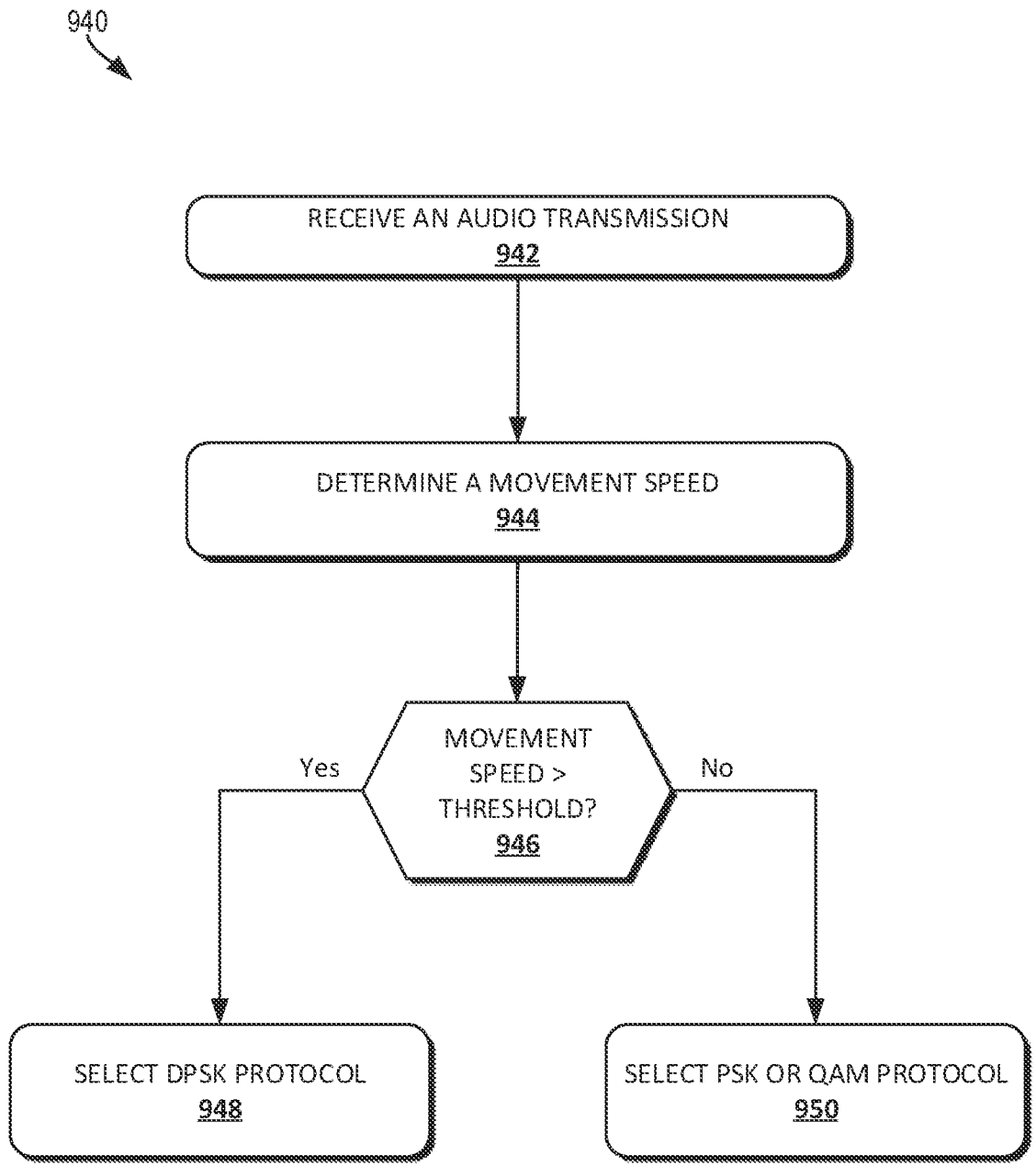

FIGS. 9A-9C illustrate methods 900, 920, 940 for receiving and decoding audio transmissions and selecting modulation protocols according to an exemplary embodiment of the present disclosure. In particular, the method 900 may be performed to identify a modulation protocol used to encode a received analog audio signal. The methods 920, 940 may be performed to select a modulation protocol for use in encoding an analog audio signal for transmission. The methods 900, 920, 940 may be implemented on a computer system, such as the system 500. For example, the methods 900, 920, 940 may be implemented by the computing device 502. The methods 900, 920, 940 may also be implemented by a set of instructions stored on a computer-readable medium that, when executed by a processor, cause the computer system to perform the methods 900, 920, 940. For example, all or part of the methods 900, 920, 940 may be implemented by a processor and a memory of the computing device 502. Although the examples below are described with reference to the flowchart illustrated in FIGS. 9A-9C, many other methods of performing the acts associated with FIGS. 9A-9C may be used. For example, the order of some of the blocks may be changed, certain blocks may be combined with other blocks, one or more of the blocks may be repeated, and some of the blocks described may be optional.

The method 900 begins with receiving an audio transmission (block 902). For example, a computing device may receive the audio transmission 508 transmitted by the computing device 502. After receiving the audio transmission 508, the computing device may be configured to identify and extract data stored within the audio transmission 508. In particular, the computing device may be configured to decode a payload of the audio transmission 508, which may include data encoded according to one or more modulation protocols (e.g., PSK protocols, DPSK protocols, QAM protocols). However, computing device may not know which modulation protocol was used to encode the data. Accordingly, the computing device must identify the proper modulation protocol in order to accurately extract the data from the audio transmission.

The computing device may decode the audio transmission according to a DPSK protocol (block 904). For example, the computing device may decode at least a portion of the audio transmission 508 (e.g., a payload of the audio transmission 508, an analog audio signal 530 of the audio commission 508) by identifying discrete symbols within the audio transmission 508 and by identifying phases for the discrete symbols. The computing device may then reconstruct digital data bits according to differences between the phases of consecutive symbols within the audio transmission 508. For example, digital bits may be expected from the phase differences according to a DPSK protocol such as the DPSK protocol 610. This process may be repeated for at least a subset of the symbols detected within the audio transmission 508.

It may then be determined whether the audio transmission was successfully decoded (block 906). For example, the computing device may analyze the digital bits extracted from the audio transmission 508 to determine whether valid or comprehensible digital data is extracted from the audio transmission 508. For example, digital data transmitted by audio transmission may be stored within the audio transmission in addition to one or more error-checking mechanisms (e.g., parity bits, checksums, and the like). The computing device may analyze one or more of the error-checking mechanisms within the digital data extracted from the audio transmission 508. If the error-checking mechanisms are successfully analyzed, the computing device may determine that the digital data was accurately extracted from the audio transmission 508. Otherwise, the computing device may determine that the digital data was not accurately extracted from the audio transmission 508. As a specific example, a 16-bit cyclic redundancy check (CRC 16) error checking code may be included in one or both of a header (or other predetermined portion) and a payload of the audio transmission. The computing device may decode all or part of the audio transmission 508 (e.g., the header of the audio transmission 508) according to the DPSK protocol and may determine whether the CRC 16 code in the decoded audio transmission 508 is correct. If so, the computing device may determine that the audio transmission 508 was successfully decoded. If not, the computing device may determine that the audio transmission 508 was not successfully decoded.

In additional or alternative implementations, the computing device may analyze the digital data to determine whether the digital data complies with one or more expected formats for the digital data (e.g., JSON formats, CSV formats, and the like). If the digital data extracted from the audio transmission 508 complies with one or more expected formats, the computing device may determine that the audio transmission 508 was successfully decoded. Otherwise, the computing device may determine that the data was not successfully decoded.

If the audio transmission was successfully decoded, the computing device may proceed with processing the contents of the audio transmission (block 910). For example, the audio transmission 508 may be received in order to perform one or more functions (e.g., authenticating a user, processing a payment, exchanging data for storage, and the like). The computing device may accordingly proceed with processing the data extracted from the audio transmission 508.

If the audio transmission was not successfully decoded, the computing device may decode the audio transmission according to a different protocol (block 908). For example, the computing device may reconstruct digital data bits based on a PSK protocol or QAM protocol. For example, the computing device may reconstruct digital data bits based on the PSK protocol 600 and/or the QAM protocol 630. The computing device may then proceed with processing the contents of the audio transmission (block 910). In certain instances, the computing device may return to block 906 after block 908 to confirm whether the audio transmission was accurately decoded. For example, the computing device 502 may initially attempt to decode the audio transmission 508 using a QAM protocol 521, 630 and, if successful, may proceed to processing the contents of the audio transmission 508 at block 910. If not successful, the computing device 502 may proceed with decoding the audio transmission with a still further protocol (e.g., a PSK protocol 518, 600). Processing may repeat in this way with various types of protocols (e.g., different types of PSK, DPSK, and/or QAM protocols) until the audio transmission 508 is accurately decoded.

In this way, a computing device that receives an audio transmission is able to identify and use a proper modulation protocol to decode and reconstruct digital data stored within the audio transmission. This enables computing devices to communicate using audio transmissions that switch between different modulation protocols without having to exchange additional transmissions to select a modulation protocol ahead of time. In the above examples, it was assumed that computing devices are configured to communicate using two different protocols: a single DPSK protocol and a single PSK protocol. It should be understood that, in additional or alternative implementations, the computing devices may be configured to communicate using more than two different protocols. In such instances, the computing device may repeat at least part of the method 900 (e.g., blocks 906, 908) to decode the audio transmission using the modulation protocols and to determine when the audio transmission was successfully decoded. Similarly, in additional or alternative implementations, rather than initially decoding the audio transmission according to a DPSK protocol at block 904, the computing device may initially decode the audio transmission using a different modulation protocol (e.g., a PSK modulation protocol).

In certain instances, as discussed above, the audio transmission may also include an indication of a modulation protocol (e.g., within a predetermined portion of the audio transmission). In such instances, a computing device that receives the audio transmission may extract the indication of the modulation protocol and may initially decode the audio transmission according to the indicated modulation protocol.

The method 920 may begin with receiving audio transmission (block 922). The audio transmission 508 may be received by the computing device (e.g., from the computing device 502), as discussed above in connection with block 902 of the method 900.

The computing device may determine a signal-to-noise ratio (SNR) for the received audio transmission (block 924). For example, noise within the received audio transmission may be received by identifying an average (e.g., moving average) of audio signals received within an audio channel for the audio transmission (e.g., predetermined threshold of a carrier frequency of the audio transmission) for a time period before receiving the audio transmission (e.g., 10 seconds, 5 seconds, 1 second, 500 ms, 250 ms, 100 ms). The power or magnitude of the received audio transmission may then be compared to the power magnitude of noise.

The computing device may determine whether the SNR exceeds a predetermined threshold (block 926). For example, the predetermined threshold may be selected to determine whether the audio transmission was received within an environment with high noise, which may reduce the accuracy of audio transmissions encoded using a DPSK or QAM encoding protocol. In one specific example, the predetermined threshold may be an SNR of 4:1 or greater when selecting between QPSK, QAM (e.g., 8QAM), and QDPSK, although other predetermined thresholds may be used depending on the specific types of PSK and DPSK protocols used (e.g., 4:1 or greater for QPSK/QDPSK/8QAM, 8:1 or greater for 8PSK/8DPSK/16QAM, and the like). In certain instances, the predetermined threshold may also be selected based on a determined distance between the transmitting computing device and the receiving computing device. For example, a higher predetermined threshold may be used for larger distances between the transmitting computing device and the receiving computing device. In certain instances, multiple thresholds may be used. For example, a first, lower threshold hold may be used to select between PSK and DPSK protocols and a second, higher threshold may be used to select between QAM and DPSK protocols.

If the SNR is not greater than the predetermined threshold, a PSK protocol may be selected (block 928). As explained above, PSK modulation techniques may be less susceptible to noise and may therefore be better suited for use in situations with high environmental noise or other interference in the audio channel used to exchange audio transmissions 508. Accordingly, upon determining that the SNR is not greater than the predetermined threshold, the computing device may select the PSK protocol 518 for use in subsequent audio transmissions (e.g., for use in audio transmissions generated and transmitted by the computing device that received the audio transmission 508).

If the SNR is greater than the predetermined threshold, a DPSK or QAM protocol may be selected (block 930). As explained above, DPSK and QAM modulation techniques may be more susceptible to noise, but may enable improved accuracy for received audio transmissions. Accordingly, in situations that do not have high environmental noise or other interference, the computing device may select the DPSK protocol 520 or QAM protocol 521 for use in subsequent audio transmissions (e.g., for use in audio transmissions generated and transmitted by the computing device that received the audio transmission 508).

The method 940 may begin with receiving an audio transmission (block 942). The audio transmission 508 may be received by the computing device (e.g., from the computing device 502), as discussed above in connection with block 902 of the method 900.

A movement speed may then be determined (block 944). For example, a movement speed may be determined between the computing device 502 that transmitted the audio transmission 508 and the computing device that received the audio transmission. The movement speed may include a movement speed of the transmitting computing device 502 relative to the receiving computing device, or vice versa. Additionally or alternatively, the movement speed may include a movement speed of both the transmitting computing device 502 and the receiving computing device relative to one another. In certain implementations, the movement speed may be determined at least in part based on a change in frequency or phase for a predetermined portion 526 of the audio transmission 508 (e.g., a preamble 202 of the audio transmission). Such techniques are discussed in greater detail in PCT Application No. PCT/US2019/062823, entitled "PHASE SHIFT DETECTION AND CORRECTION FOR AUDIO-BASED DATA TRANSMISSIONS" and filed on Nov. 22, 2019, which is hereby incorporated by reference. In additional or alternative implementations, the movement speed may be determined based on one or more movement sensors (e.g., accelerometers, gyroscopes) and/or location sensors (e.g., GPS sensors) on the transmitting computing device 502 and/or the receiving computing device.

The movement speed may then be compared to a predetermined threshold (block 946). For example, the computing device may determine whether the movement speed determined at block 944 exceeds a predetermined threshold. In certain instances, the predetermined threshold may be selected to determine whether the computing devices are moving fast enough relative to one another that accuracy of the transmission (e.g., while using a PSK protocol) may be adversely impacted. For example, in certain instances the predetermined threshold may 1 inch/second or greater (e.g., 2 inches/second, 4 inches/second, or more).

If the movement speed is greater than the predetermined threshold, a DPSK protocol may be selected (block 948). As explained above, DPSK modulation techniques may be less susceptible to interference caused by movement between transmitting and receiving computing devices and may therefore be better suited for use in situations with comparatively higher movement speeds. Accordingly, upon determining that the movement speed exceeds the predetermined threshold, the computing device may select the DPSK protocol 520 for use in subsequent audio transmissions (e.g., for use in audio transmissions generated and transmitted by the computing device that received the audio transmission 508).

If the movement speed is not greater than the predetermined threshold, a PSK or QAM protocol may be selected (block 950). As explained above, PSK modulation techniques may be more susceptible to interference caused by movement between transmitting and receiving computing devices, but may be less susceptible to environmental noise. Accordingly, in situations that do not have a high movement speed, the computing device may select the PSK protocol 518 for use in subsequent audio transmissions (e.g., for use in audio transmissions generated and transmitted by the computing device that received the audio transmission 508). Additionally or alternatively, the computing device may select the QAM protocol 521 for use in subsequent audio transmissions if the amount of data to be transmitted, or expected to be transmitted, exceeds a predetermined threshold (e.g., 0.1 kB, 0.5 kB, 1 kB, and the like). As explained above, QAM protocols may be able to achieve higher transmission bitrates than PSK or DPSK protocols and may therefore be advantageous to use if large amounts of data will be exchanged.

In this way, by performing one or both of the methods 920, 940, computing devices may be able to select between appropriate modulation protocols depending on conditions within the transmitting environment (e.g., environmental noise, audio channel interference) and depending on movement speed between the computing devices. In this way, accuracy and reliability of data transmitted using audio transmissions may be proved, as modulation techniques adapt to changes within the transmitting environment and between the computing devices. In certain implementations, as explained above, a modulation protocol used to generate an analog audio signal for an audio transmission may be indicated within a portion of the audio transmission (e.g., a predetermined portion). In such instances, after selecting a protocol at blocks 928, 930, 948, 950, the computing device may add an indication of the selected modulation protocol to the audio transmission before transmitting.

In the above-discussed examples, computing devices were selecting between DPSK protocols, PSK protocols, and QAM protocols. In additional or alternative implementations, the computing devices select between different types of protocols. For example, in certain instances, computing devices may select between two different types of DPSK protocols, two different types of QAM protocols, and/or two different types of PSK protocols. In one specific example, in the method 940, if the movement speed is greater than a predetermined threshold block 946, a QDPSK protocol may be selected, whereas an 8DPSK protocol may be selected if the movement speed is less than the predetermined threshold. Additionally, although particular exemplary thresholds for movement speed and SNR are discussed above, it should be understood that additional or alternative thresholds different from those discussed above may be used (e.g., different values of SNR threshold at block 926, different movement speed thresholds a block 946).

Figure 10:
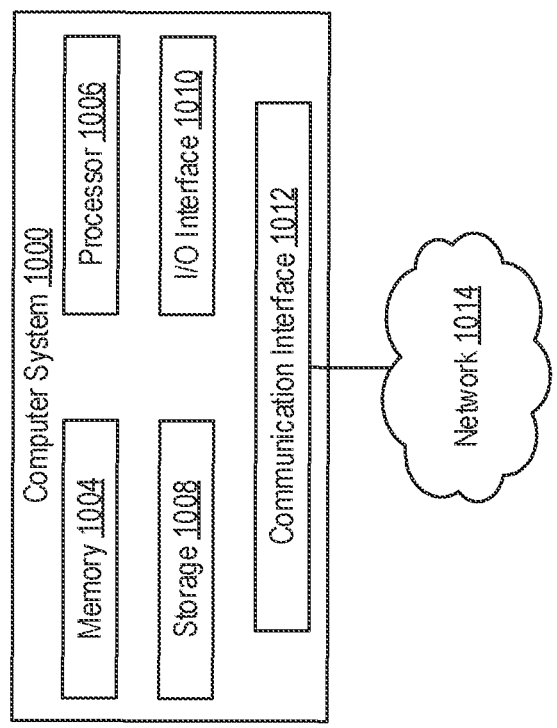
FIG. 10 illustrates a computing system according to an exemplary embodiment of the present disclosure.

FIG. 10 illustrates an example computer system 1000 that may be utilized to implement one or more of the devices and/or components discussed herein, such as the computing devices 102, 104, 402, 404, 502. In particular embodiments, one or more computer systems 1000 perform one or more steps of one or more methods described or illustrated herein. In particular embodiments, one or more computer systems 1000 provide the functionalities described or illustrated herein. In particular embodiments, software running on one or more computer systems 1000 performs one or more steps of one or more methods described or illustrated herein or provides the functionalities described or illustrated herein. Particular embodiments include one or more portions of one or more computer systems 1000. Herein, a reference to a computer system may encompass a computing device, and vice versa, where appropriate. Moreover, a reference to a computer system may encompass one or more computer systems, where appropriate.

This disclosure contemplates any suitable number of computer systems 1000. This disclosure contemplates the computer system 1000 taking any suitable physical form. As example and not by way of limitation, the computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1006, memory 1004, storage 1008, an input/output (I/O) interface 1010, and a communication interface 1012. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 1006 includes hardware for executing instructions, such as those making up a computer program. As an example and not by way of limitation, to execute instructions, the processor 1006 may retrieve (or fetch) the instructions from an internal register, an internal cache, memory 1004, or storage 1008; decode and execute the instructions; and then write one or more results to an internal register, internal cache, memory 1004, or storage 1008. In particular embodiments, the processor 1006 may include one or more internal caches for data, instructions, or addresses. This disclosure contemplates the processor 1006 including any suitable number of any suitable internal caches, where appropriate. As an example and not by way of limitation, the processor 1006 may include one or more instruction caches, one or more data caches, and one or more translation lookaside buffers (TLBs). Instructions in the instruction caches may be copies of instructions in memory 1004 or storage 1008, and the instruction caches may speed up retrieval of those instructions by the processor 1006. Data in the data caches may be copies of data in memory 1004 or storage 1008 that are to be operated on by computer instructions; the results of previous instructions executed by the processor 1006 that are accessible to subsequent instructions or for writing to memory 1004 or storage 1008; or any other suitable data. The data caches may speed up read or write operations by the processor 1006. The TLBs may speed up virtual-address translation for the processor 1006. In particular embodiments, processor 1006 may include one or more internal registers for data, instructions, or addresses. This disclosure contemplates the processor 1006 including any suitable number of any suitable internal registers, where appropriate. Where appropriate, the processor 1006 may include one or more arithmetic logic units (ALUs), be a multi-core processor, or include one or more processors 1006. Although this disclosure describes and illustrates a particular processor, this disclosure contemplates any suitable processor.

In particular embodiments, the memory 1004 includes main memory for storing instructions for the processor 1006 to execute or data for processor 1006 to operate on. As an example, and not by way of limitation, computer system 1000 may load instructions from storage 1008 or another source (such as another computer system 1000) to the memory 1004. The processor 1006 may then load the instructions from the memory 1004 to an internal register or internal cache. To execute the instructions, the processor 1006 may retrieve the instructions from the internal register or internal cache and decode them. During or after execution of the instructions, the processor 1006 may write one or more results (which may be intermediate or final results) to the internal register or internal cache. The processor 1006 may then write one or more of those results to the memory 1004. In particular embodiments, the processor 1006 executes only instructions in one or more internal registers or internal caches or in memory 1004 (as opposed to storage 1008 or elsewhere) and operates only on data in one or more internal registers or internal caches or in memory 1004 (as opposed to storage 1008 or elsewhere). One or more memory buses (which may each include an address bus and a data bus) may couple the processor 1006 to the memory 1004. The bus may include one or more memory buses, as described in further detail below. In particular embodiments, one or more memory management units (MMUs) reside between the processor 1006 and memory 1004 and facilitate accesses to the memory 1004 requested by the processor 1006. In particular embodiments, the memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory implementations, this disclosure contemplates any suitable memory implementation.

In particular embodiments, the storage 1008 includes mass storage for data or instructions. As an example and not by way of limitation, the storage 1008 may include a hard disk drive (HDD), a floppy disk drive, flash memory, an optical disc, a magneto-optical disc, magnetic tape, or a Universal Serial Bus (USB) drive or a combination of two or more of these. The storage 1008 may include removable or non-removable (or fixed) media, where appropriate. The storage 1008 may be internal or external to computer system 1000, where appropriate. In particular embodiments, the storage 1008 is non-volatile, solid-state memory. In particular embodiments, the storage 1008 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1008 taking any suitable physical form. The storage 1008 may include one or more storage control units facilitating communication between processor 1006 and storage 1008, where appropriate. Where appropriate, the storage 1008 may include one or more storages 1008. Although this disclosure describes and illustrates particular storage, this disclosure contemplates any suitable storage.

In particular embodiments, the I/O Interface 1010 includes hardware, software, or both, providing one or more interfaces for communication between computer system 1000 and one or more I/O devices. The computer system 1000 may include one or more of these I/O devices, where appropriate. One or more of these I/O devices may enable communication between a person (i.e., a user) and computer system 1000. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 1010 may include one or more device or software drivers enabling processor 1006 to drive one or more of these I/O devices. The I/O interface 1010 may include one or more I/O interfaces 1010, where appropriate. Although this disclosure describes and illustrates a particular I/O interface, this disclosure contemplates any suitable I/O interface or combination of I/O interfaces.

In particular embodiments, communication interface 1012 includes hardware, software, or both providing one or more interfaces for communication (such as, for example, packet-based communication) between computer system 1000 and one or more other computer systems 1000 or one or more networks 1014. As an example and not by way of limitation, communication interface 1012 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 1014 and any suitable communication interface 1012 for the network 1014. As an example and not by way of limitation, the network 1014 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 1000 may include any suitable communication interface 1012 for any of these networks, where appropriate. Communication interface 1012 may include one or more communication interfaces 1012, where appropriate. Although this disclosure describes and illustrates a particular communication interface implementations, this disclosure contemplates any suitable communication interface implementation.

The computer system 1002 may also include a bus. The bus may include hardware, software, or both and may communicatively couple the components of the computer system 1000 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving data for transmission;
generating a first analog audio signal that encodes the data as phase differences according to a first protocol; and
transmitting, using a speaker, a first audio transmission containing the first analog audio signal.

2. The method of claim 1, further comprising:
receiving a second audio transmission containing a second analog audio signal; and
decoding, according to the first protocol, the second audio transmission to extract a second analog audio signal.

3. The method of claim 2, further comprising:
determining that the second audio transmission was unsuccessfully decoded using the first protocol; and
decoding, according to a second protocol, the second audio transmission to extract the second analog audio signal.

4. The method of claim 1, wherein the first protocol is a differential phase-shift keying (DPSK) protocol.

5. The method of claim 4, wherein the DPSK protocol is a Quad-DPSK (QDPSK) protocol and wherein the data is encoded as symbols that are two bits in length.

6. The method of claim 1, wherein the audio transmission further includes a predetermined portion.

7. The method of claim 6, wherein the predetermined portion is encoded according to a phase-shift keying protocol.

8. The method of claim 1, further comprising:
receiving, from a computing device, a second audio transmission containing a second audio signal;
determining, based on the second audio transmission, that a movement speed of the computing device is less than a predetermined threshold; and
selecting at least one of (i) a phase-shift keying (PSK) protocol and (ii) a quadrature amplitude modulation (QAM) protocol for use in generating subsequent audio transmissions.

9. The method of claim 8, wherein the predetermined threshold is greater than or equal to 2 inches/second.

10. The method of claim 1, further comprising:
receiving a second audio transmission containing a second audio signal;
determining that a signal-to-noise ratio for the second audio transmission exceeds a predetermined threshold; and
selecting a phase-shift keying protocol for use in generating subsequent audio transmissions.

11. A system comprising:
a processor; and
a memory storing instructions which, when executed by the processor, cause the processor to:
receive data for transmission;
generate a first analog audio signal that encodes the data as phase differences according to a first protocol; and
transmit, using a speaker, a first audio transmission containing the first analog audio signal.

12. The system of claim 11, wherein the instructions further cause the processor to:
receive a second audio transmission containing a second analog audio signal; and
decode, according to the first protocol, the second audio transmission to extract a second analog audio signal.

13. The system of claim 12, wherein the instructions further cause the processor to:
determine that the second audio transmission was unsuccessfully decoded using the first protocol; and
decode, according to a second protocol, the second audio transmission to extract the second analog audio signal.

14. The system of claim 11, wherein the first protocol is a differential phase-shift keying (DPSK) protocol.

15. The system of claim 14, wherein the DPSK protocol is a Quad-DPSK (QDPSK) protocol and each of wherein the data is encoded as symbols that are two bits in length.

16. The system of claim 14, wherein the DPSK protocol is an 8DPSK protocol and wherein the data is encoded as symbols that are three bits in length.

17. The system of claim 14, wherein the audio transmission further includes a predetermined portion, wherein at least one of (i) the predetermined portion is encoded according to a phase-shift keying protocol and (ii) the predetermined portion indicates that the first analog audio signal is encoded using the DPSK protocol.

18. The system of claim 11, wherein the instructions further cause the processor to:
receiving a second audio transmission containing a second analog audio signal;
decoding, according to the first protocol, the second audio transmission to extract a second analog audio signal;
determine that the second audio transmission was unsuccessfully decoded using the first protocol; and
decode, according to at least one of (i) a phase-shift keying (PSK) protocol and (ii) a quadrature amplitude modulation (QAM) protocol, the second audio transmission to extract the second analog audio signal.

19. The system of claim 11, wherein the instructions further cause the processor to:
receive, from a computing device, a second audio transmission containing a second audio signal;
determine, based on the second audio transmission, that a movement speed of the computing device is less than a predetermined threshold; and
select at least one of (i) a phase-shift keying (PSK) protocol and (ii) a quadrature amplitude modulation (QAM) protocol for use in generating subsequent audio transmissions.

20. The system of claim 11, wherein the instructions further cause the processor to:
receive a second audio transmission containing a second audio signal;
determine that a signal-to-noise ratio for the second audio transmission exceeds a predetermined threshold; and
select a phase-shift keying protocol for use in generating subsequent audio transmissions.

\* \* \* \* \*

UNITED STATES PATENT AND TRADEMARK OFFICE
CERTIFICATE OF CORRECTION

Page 1 of 1

PATENT NO. : 12,250,028 B2
APPLICATION NO. : 18/069679
DATED : March 11, 2025
INVENTOR(S) : Rebekah Farrar et al.

It is certified that error appears in the above-identified patent and that said Letters Patent is hereby corrected as shown below:

On the Title Page

(71) Applicant:
Please delete "LISNR, Inc" and insert --LISNR, Inc.--.

Signed and Sealed this
Twenty-ninth Day of April, 2025

Coke Morgan Stewart
*Acting Director of the United States Patent and Trademark Office*